(12) United States Patent
Mihara

(10) Patent No.: US 6,985,301 B2
(45) Date of Patent: *Jan. 10, 2006

(54) ZOOM LENS

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/692,809

(22) Filed: Oct. 27, 2003

(65) Prior Publication Data

US 2005/0073751 A1 Apr. 7, 2005

(30) Foreign Application Priority Data

Oct. 31, 2002 (JP) .............................. 2002-318547

(51) Int. Cl.
*G02B 15/14* (2006.01)

(52) U.S. Cl. ...................................... 359/682; 359/686

(58) Field of Classification Search ................ 359/676, 359/683, 680–682, 686
See application file for complete search history.

(56) References Cited

U.S. PATENT DOCUMENTS

| 5,157,550 | A | 10/1992 | Tsuchida et al. ............ 359/686 |
| 5,668,668 | A | 9/1997 | Shibayama et al. ......... 359/683 |
| 5,721,642 | A | 2/1998 | Shibayama et al. ......... 359/686 |
| 5,798,871 | A | 8/1998 | Shibayama et al. ......... 359/684 |
| 6,088,169 | A | 7/2000 | Ohno .......................... 359/682 |
| 6,124,987 | A | 9/2000 | Kayanuma et al. ......... 359/692 |
| 6,308,011 | B1 | 10/2001 | Wachi et al. .................. 396/72 |
| 2004/0051960 | A1 * | 3/2004 | Mihara ....................... 359/686 |

FOREIGN PATENT DOCUMENTS

| JP | 09-211287 | 8/1997 |
| JP | 11-194274 | 7/1999 |
| JP | 2000-137164 | 5/2000 |

* cited by examiner

Primary Examiner—Scott J. Sugarman
(74) Attorney, Agent, or Firm—Kenyon & Kenyon

(57) ABSTRACT

A zoom lens has, on the most object side, a first lens unit that has a prism with a reflecting surface for folding the path of rays, that has a negative refractive power in its entirety and that is fixed in a magnification change, and an aperture stop that is fixedly positioned in reference to the image pickup surface. The ray-entering surface of the prism has an aspherical surface concave toward the object side that exerts a weaker power for divergence at a position thereon farther from the optical axis. Whereby, a zoom lens with high optical specification performance and extremely thin size in depth direction is provided.

18 Claims, 40 Drawing Sheets

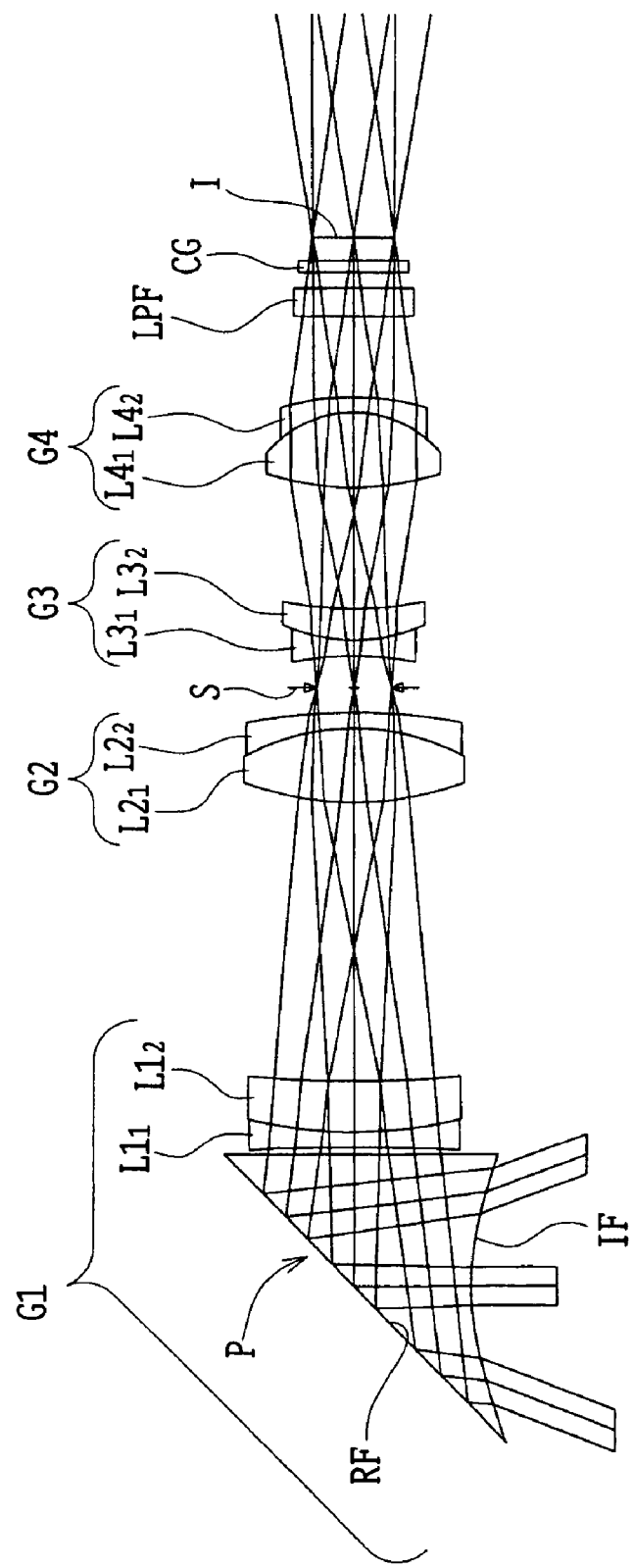

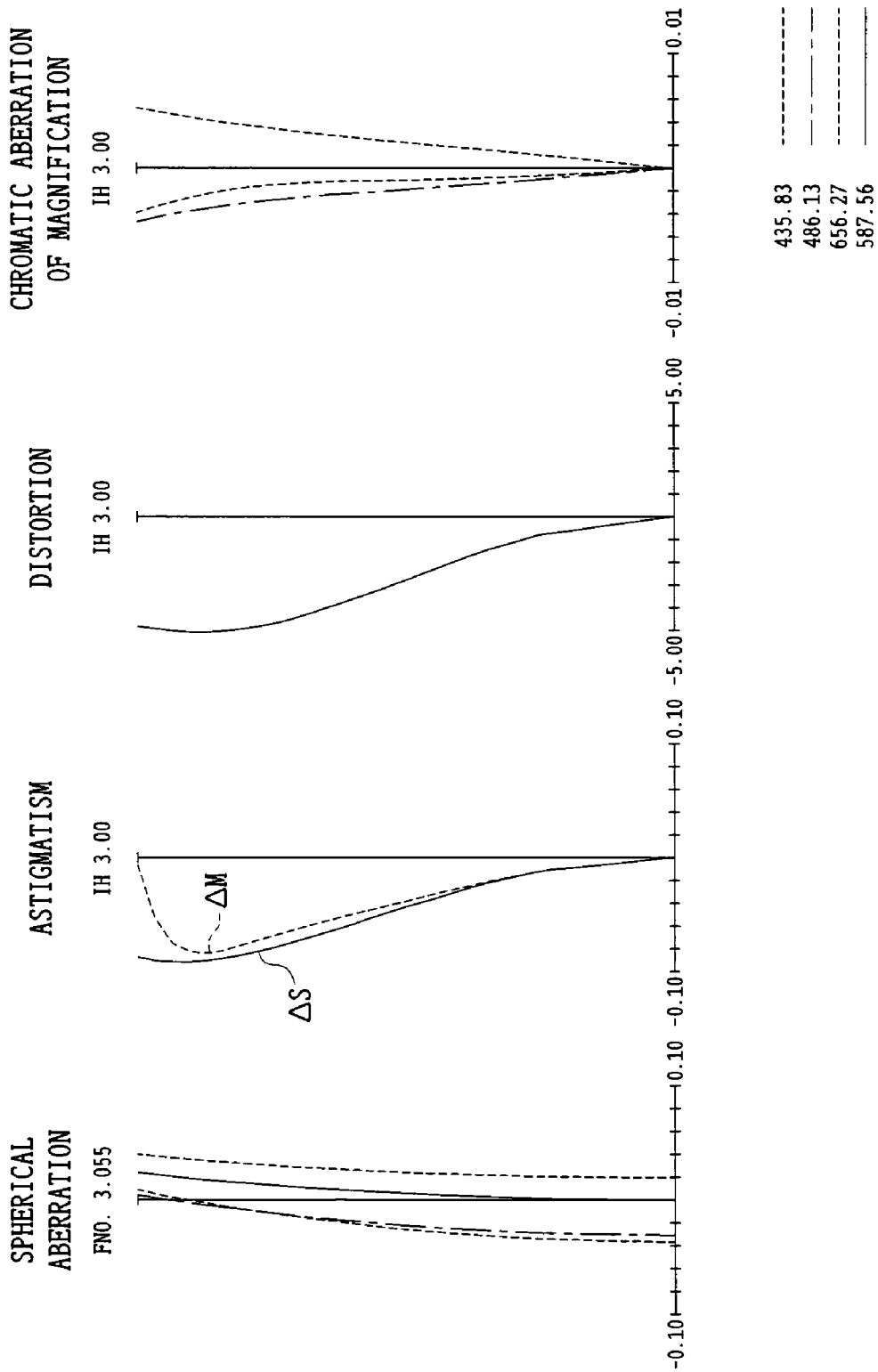

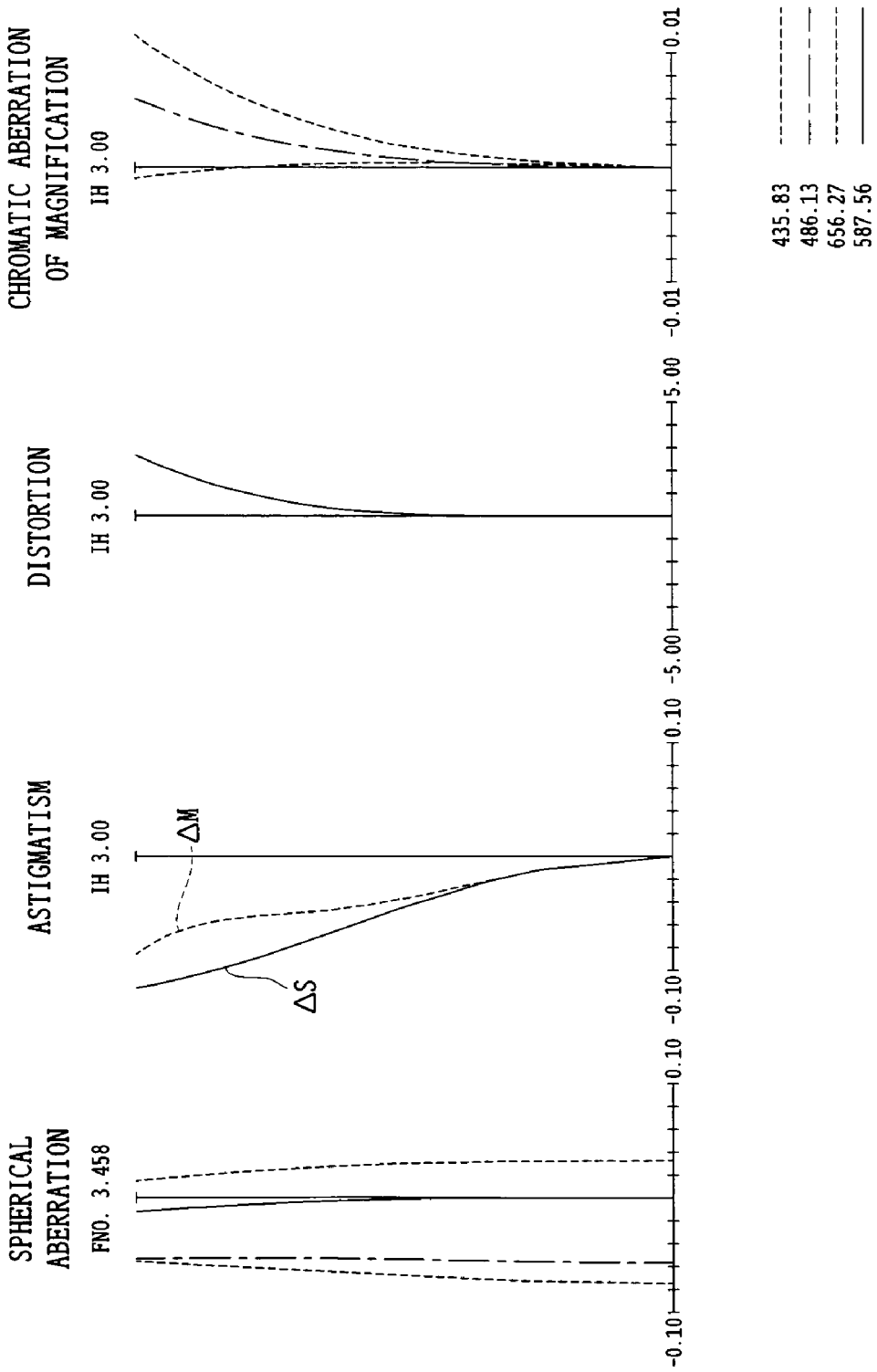

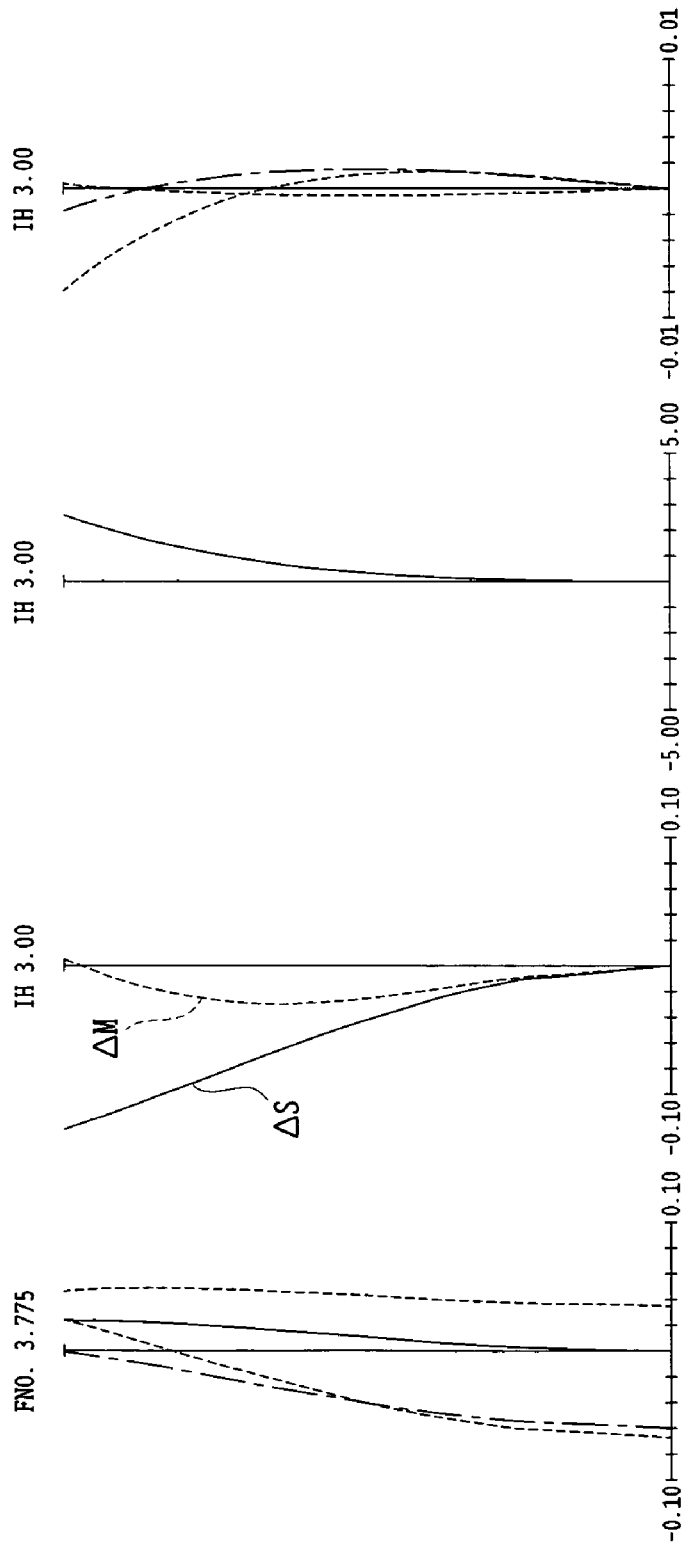

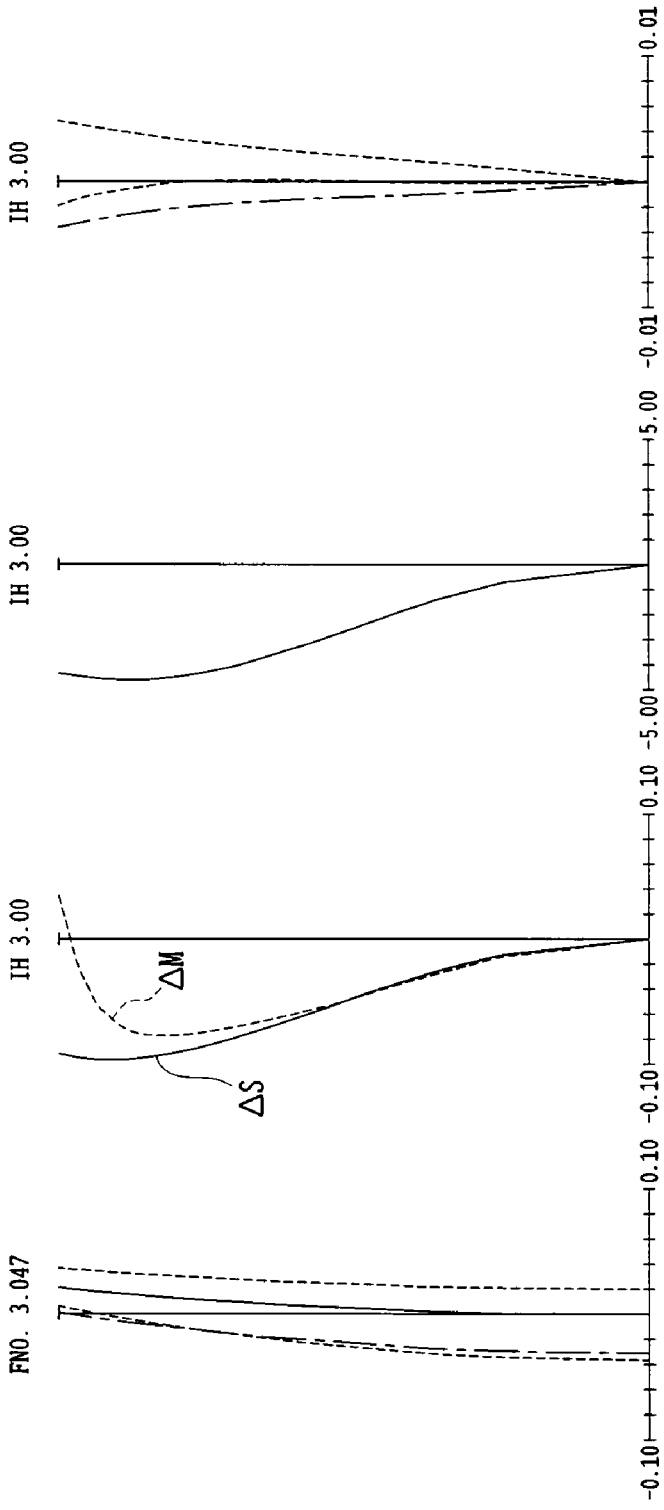

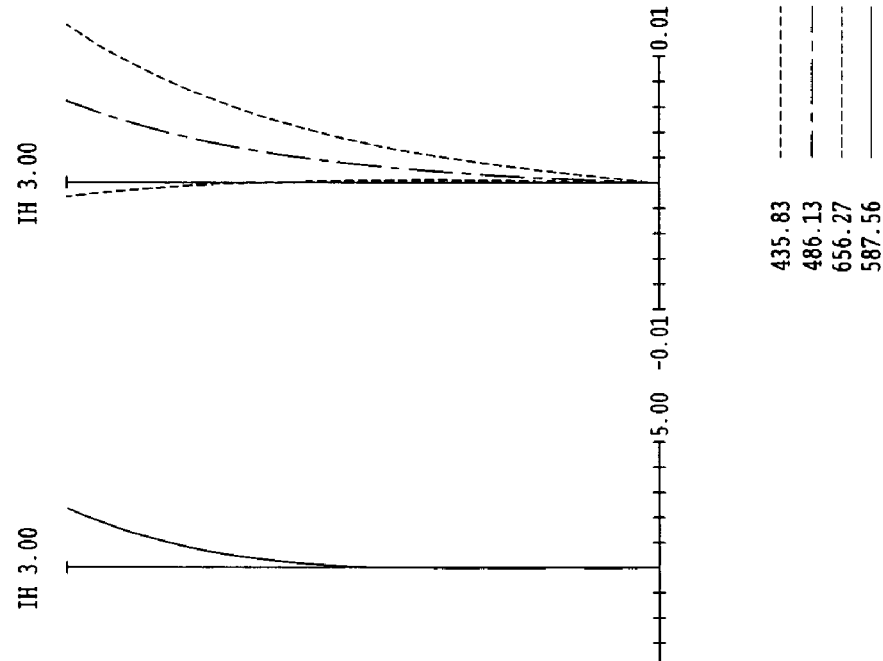

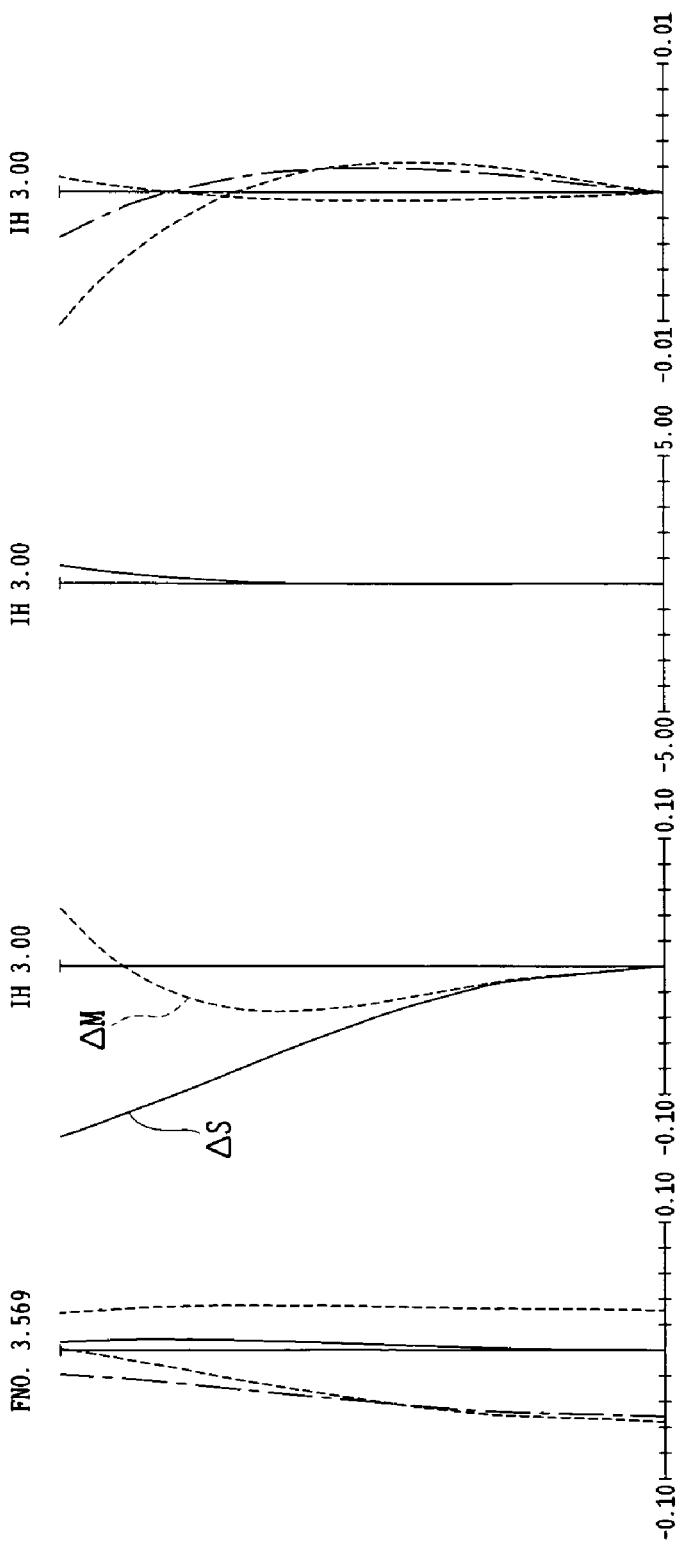

 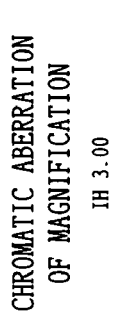
FIG. 11A SPHERICAL ABERRATION FNO. 3.398
FIG. 11B ASTIGMATISM IH 3.00
FIG. 11C DISTORTION IH 3.00
FIG. 11D CHROMATIC ABERRATION OF MAGNIFICATION IH 3.00
435.83
486.13
656.27
587.56

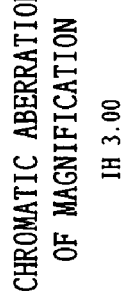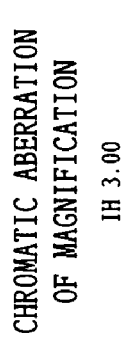

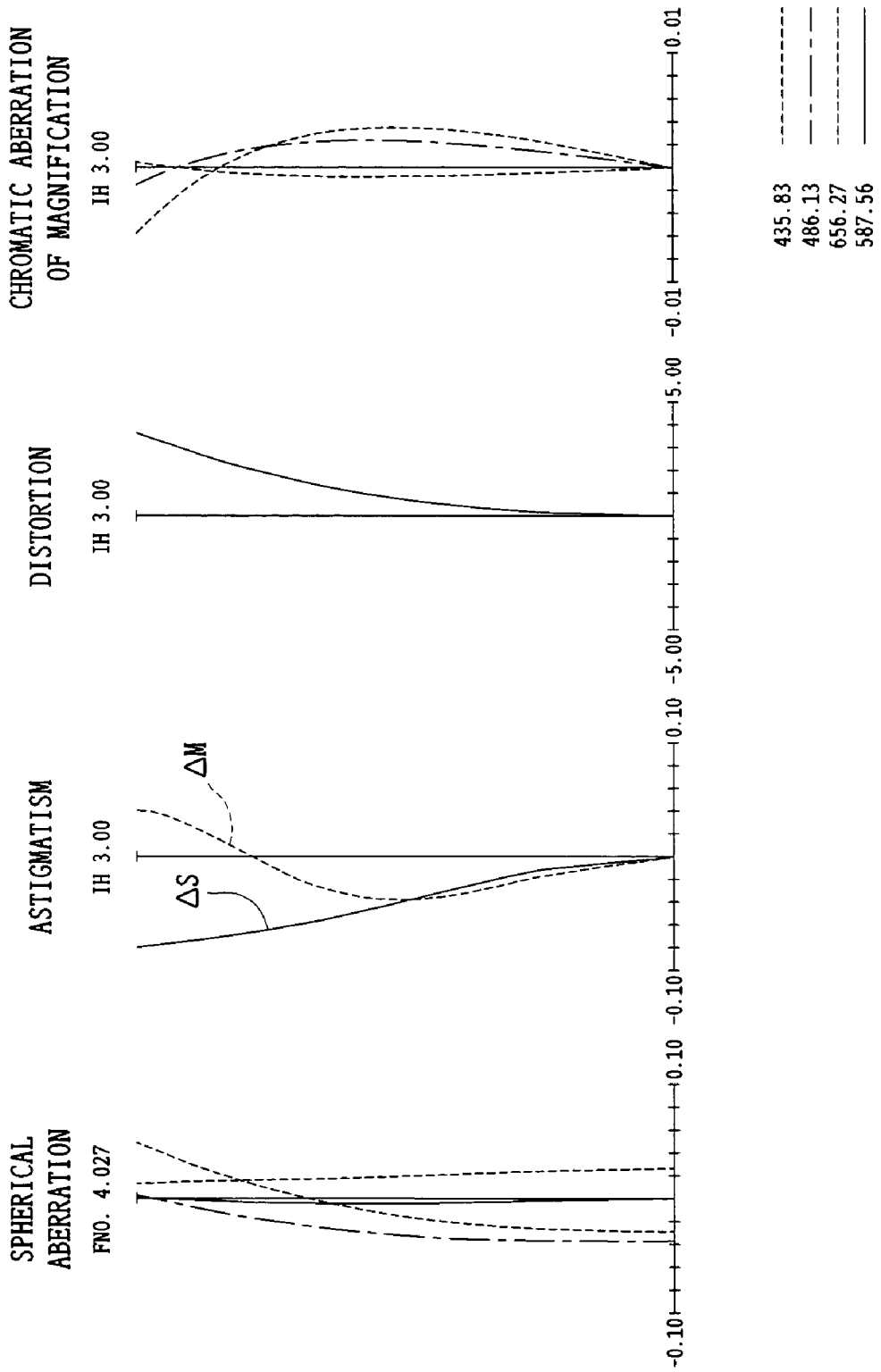

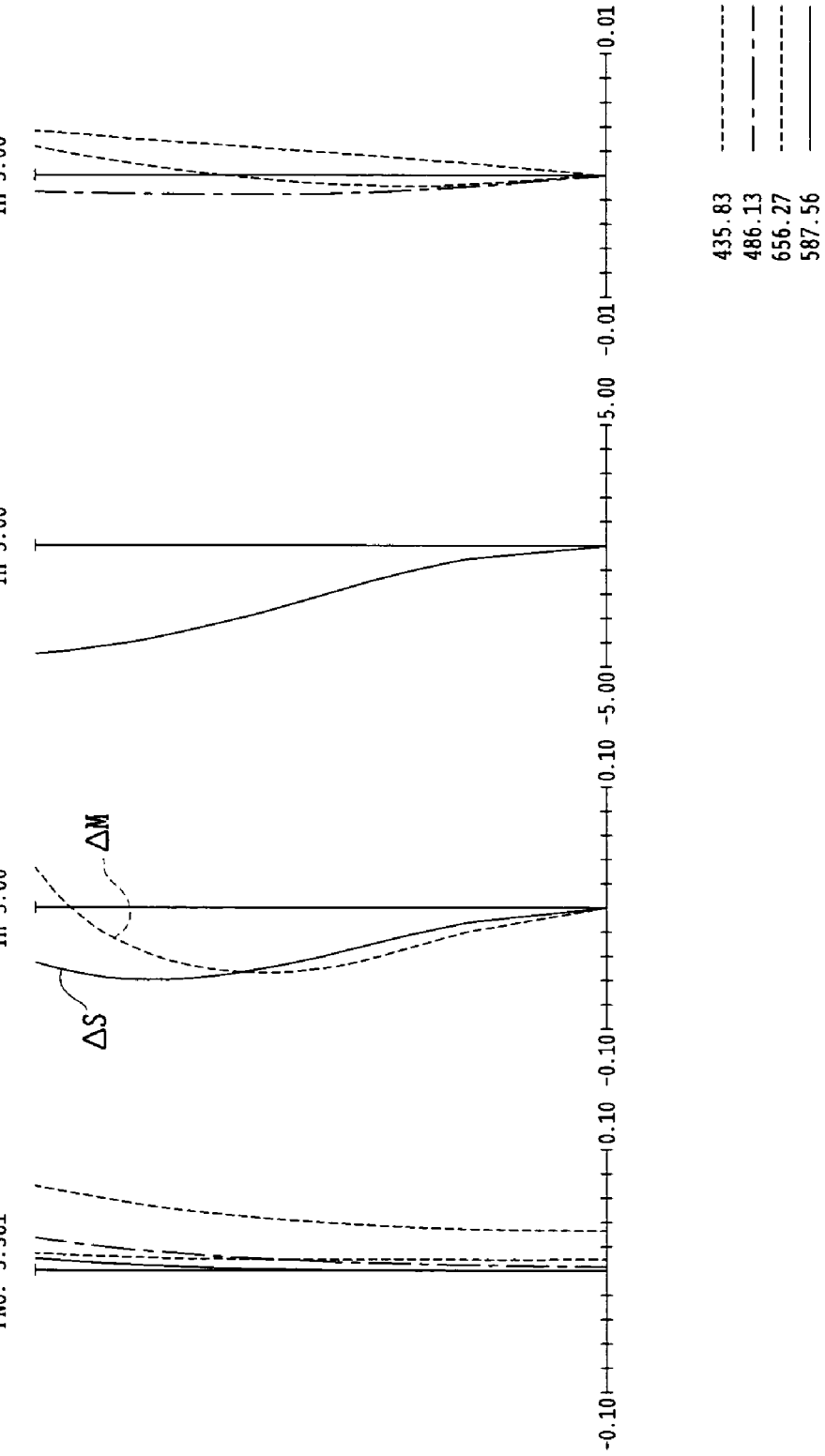

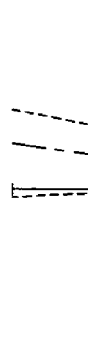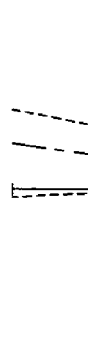

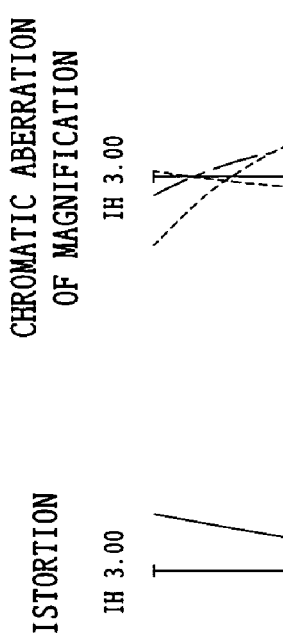
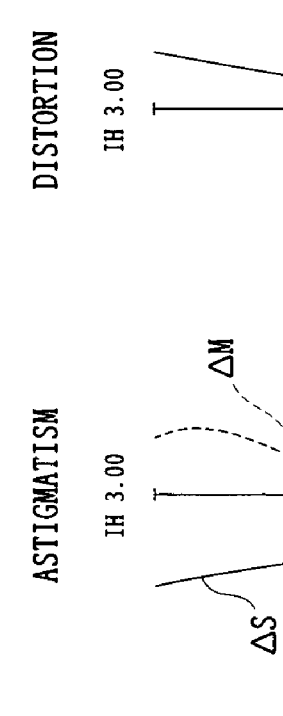
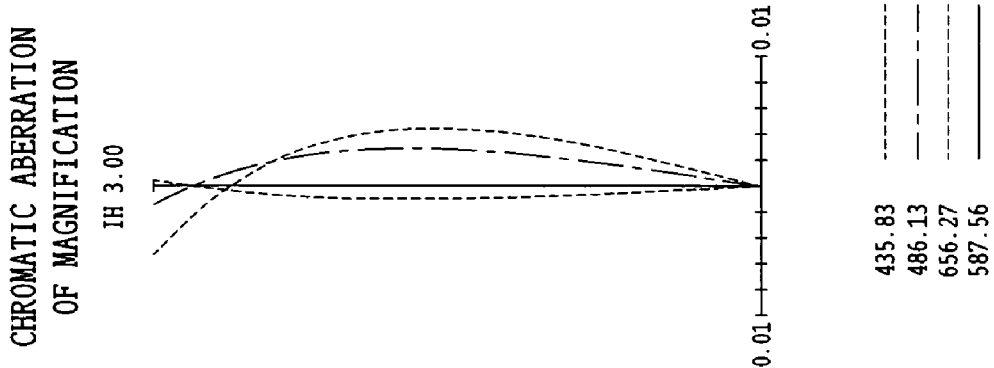

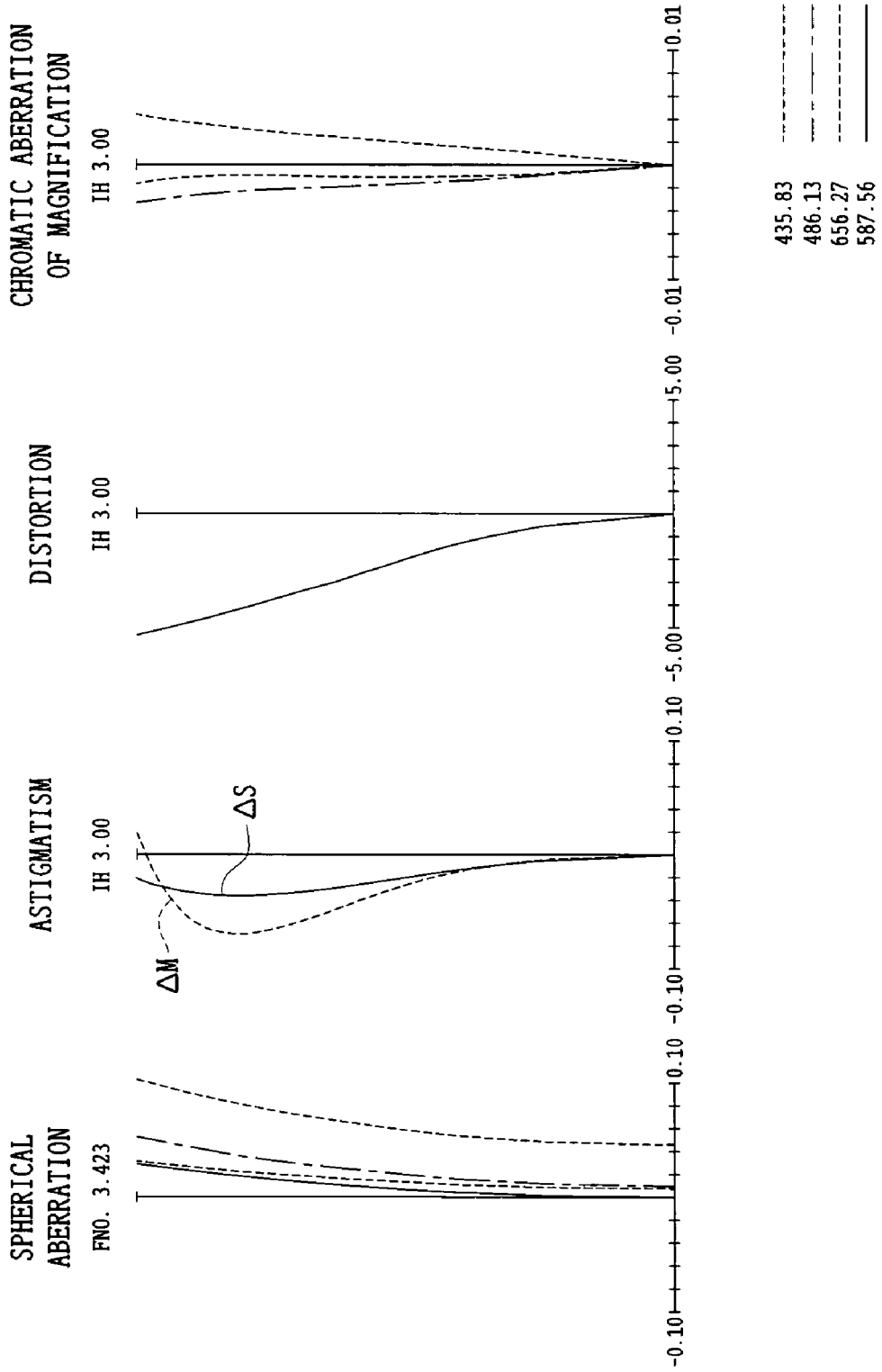

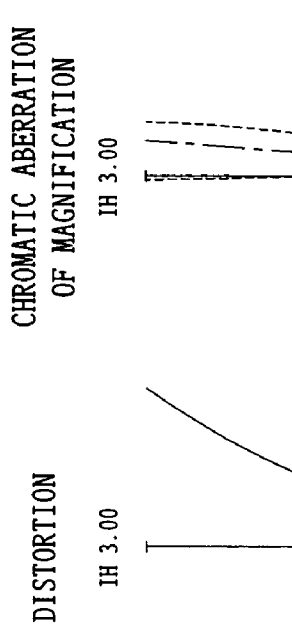
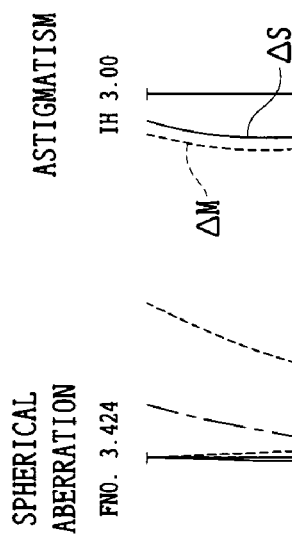
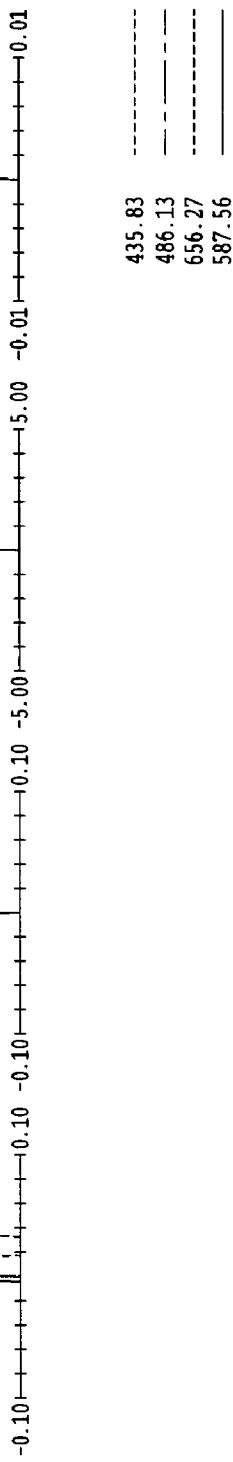

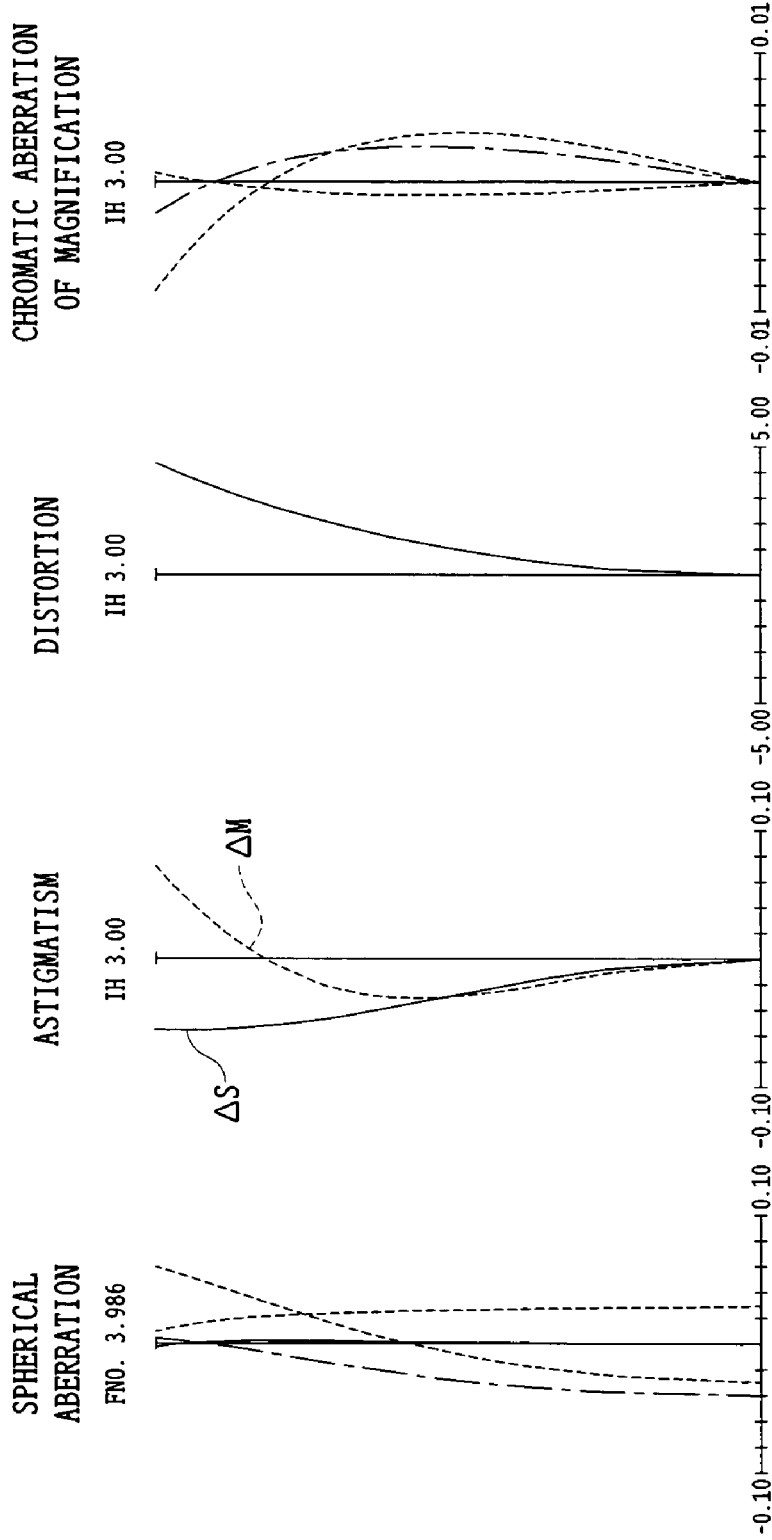

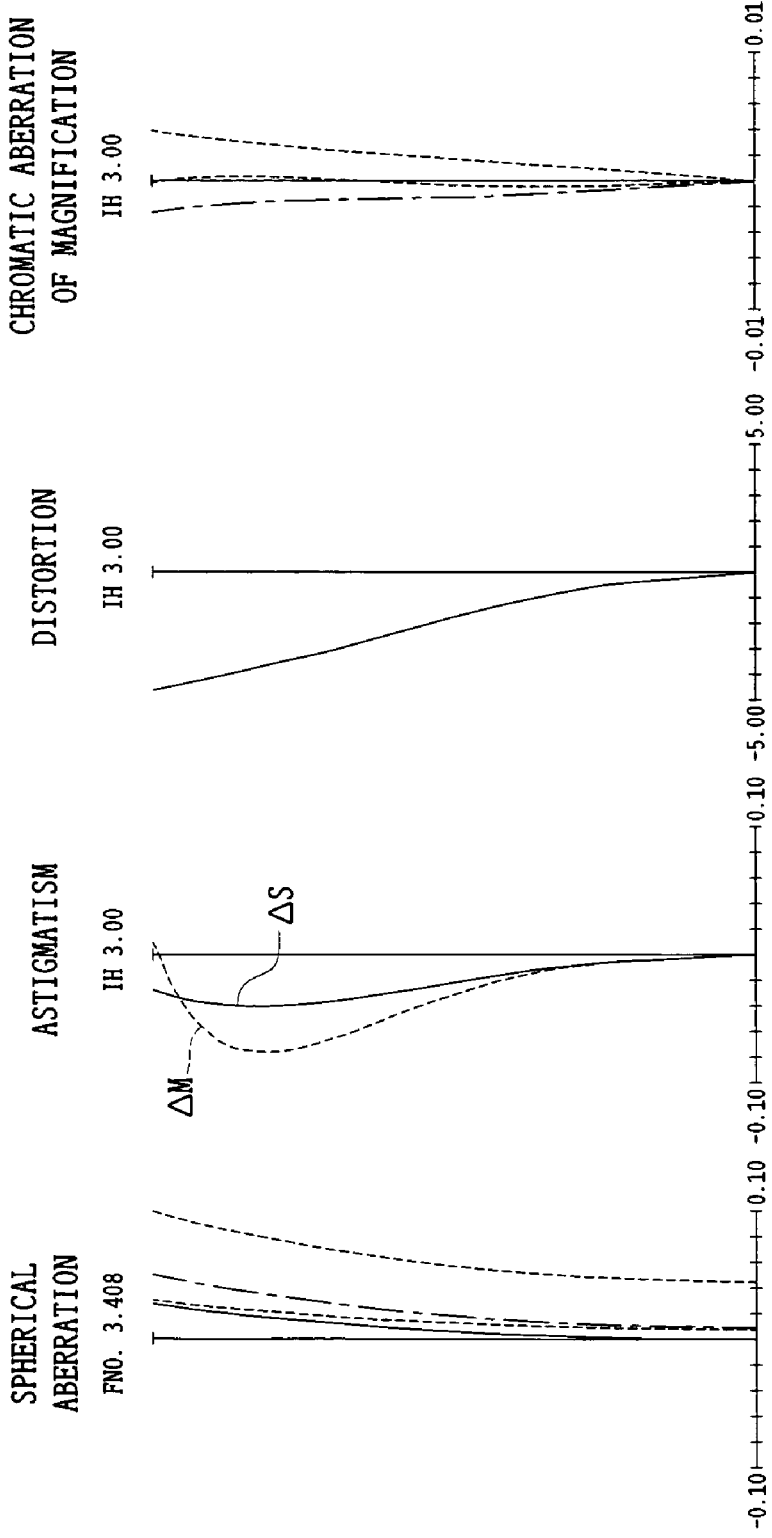

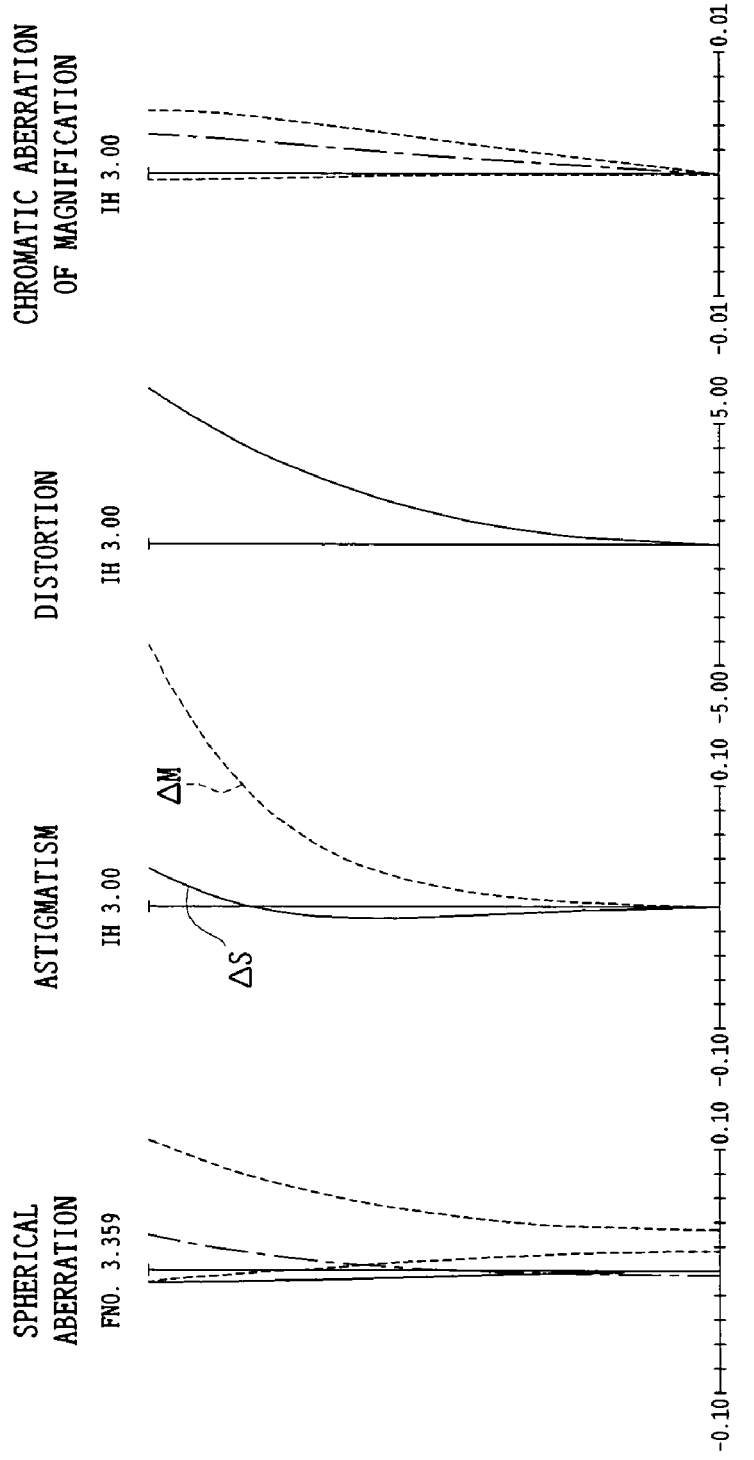

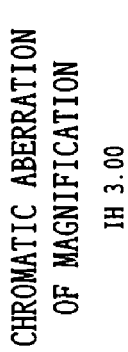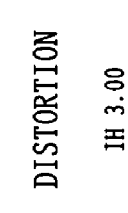

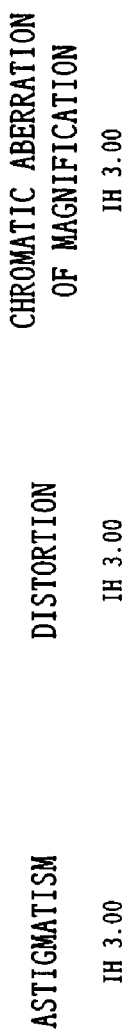

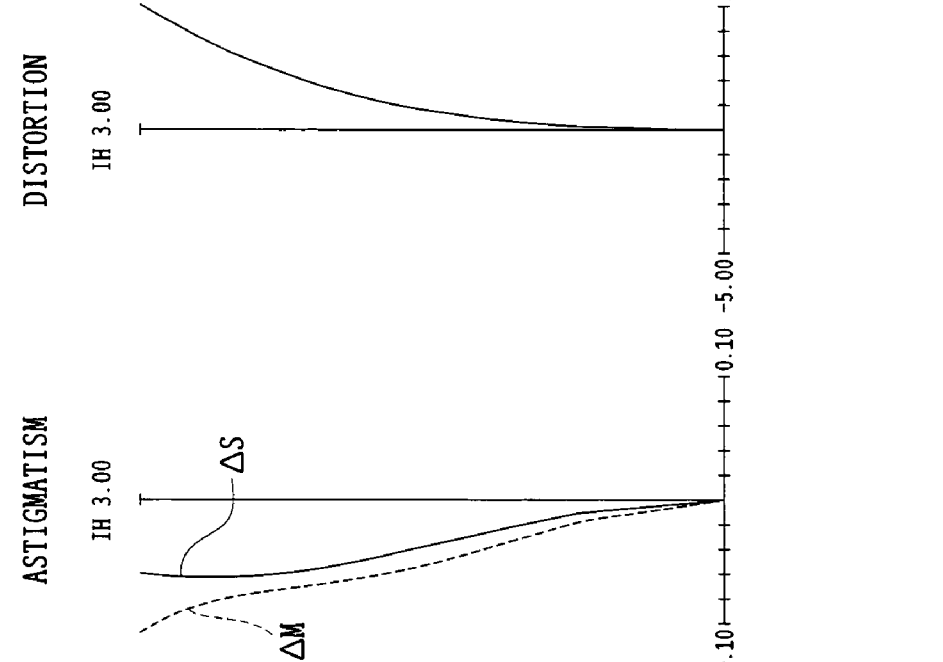
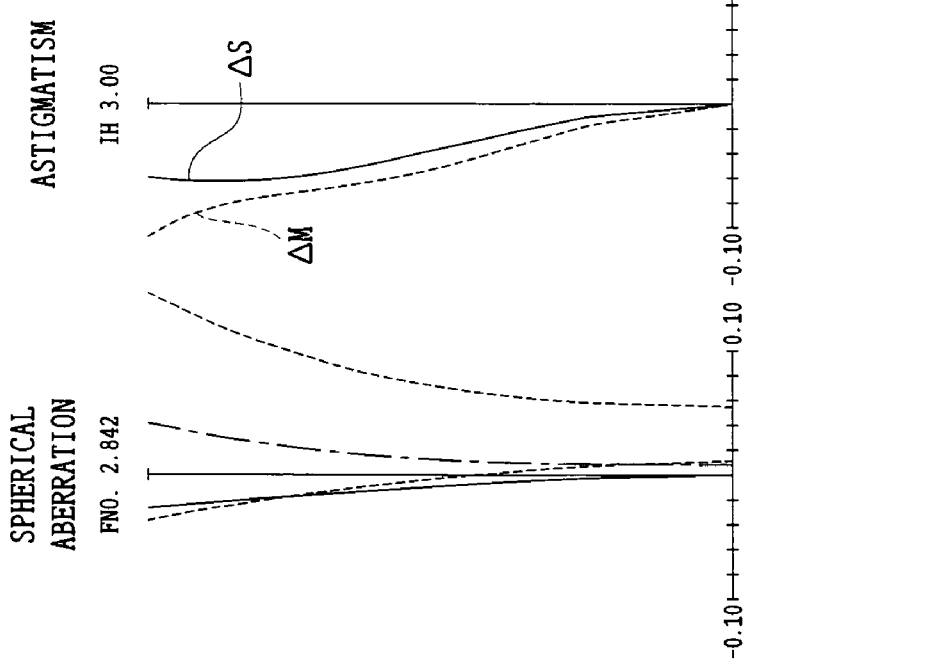

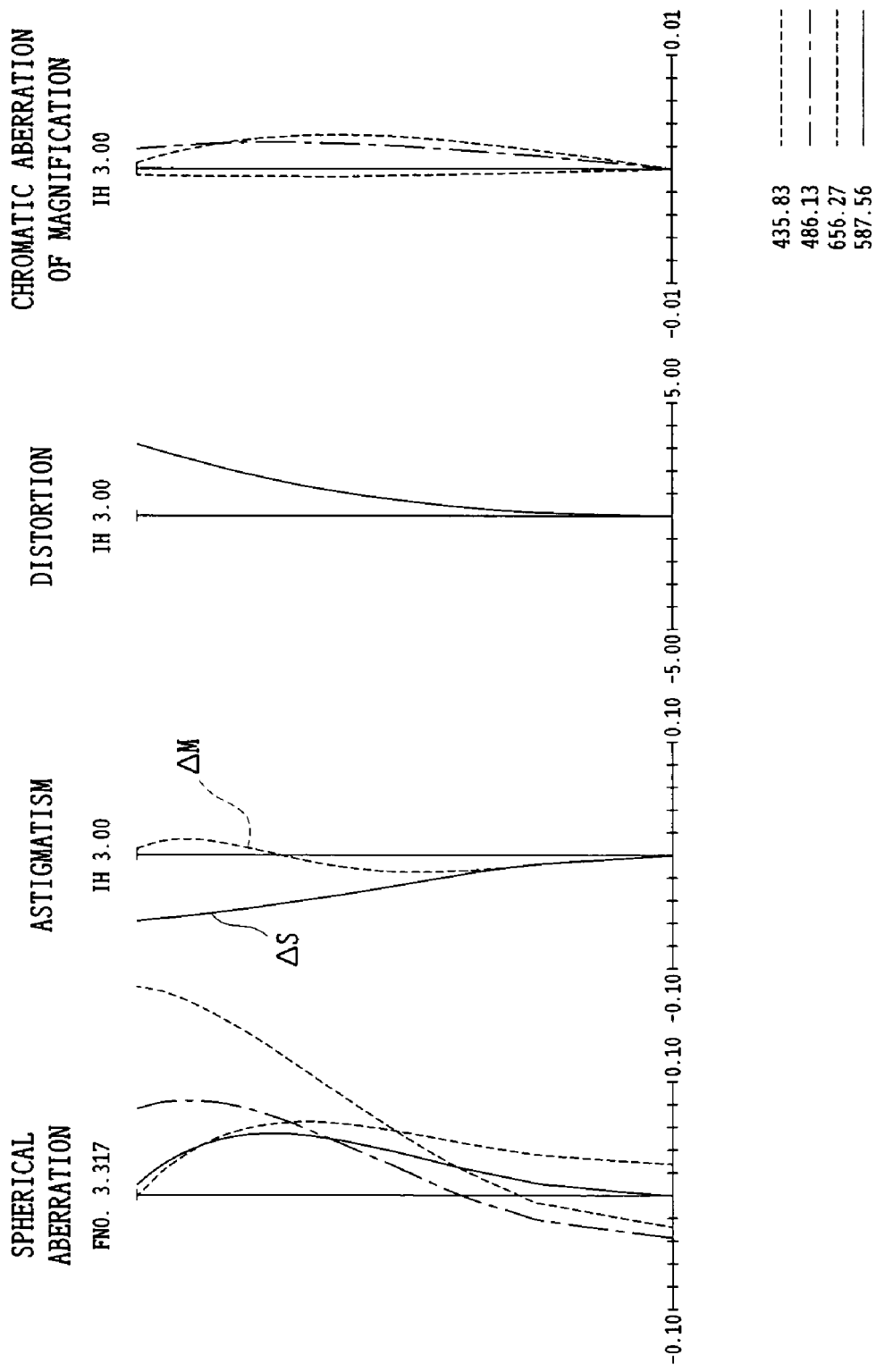

SPHERICAL ABERRATION  ASTIGMATISM  DISTORTION  CHROMATIC ABERRATION OF MAGNIFICATION 435.83
486.13
656.27
587.56

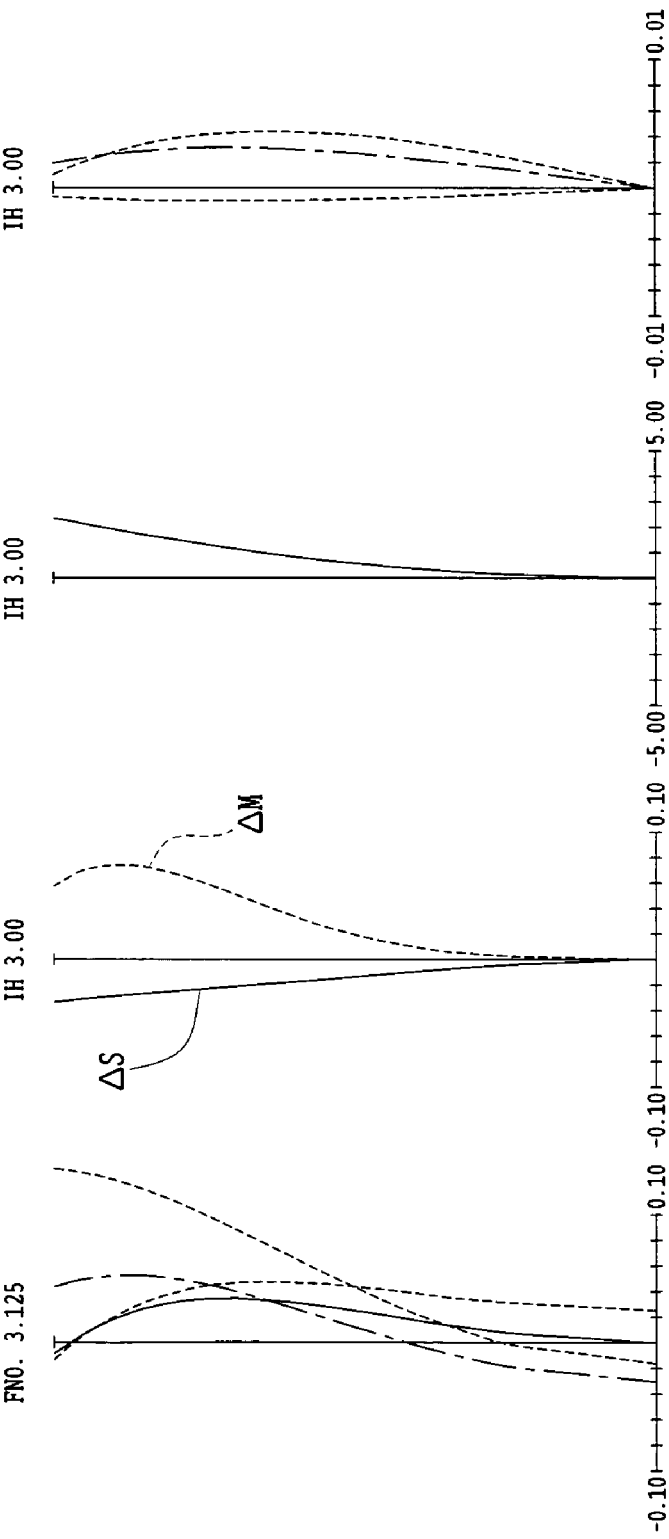

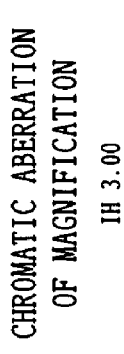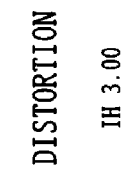

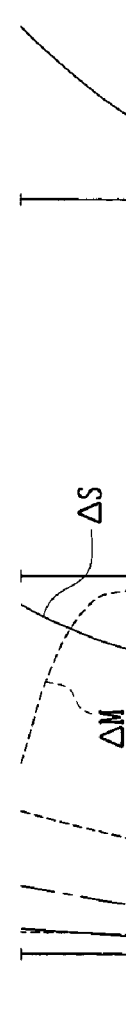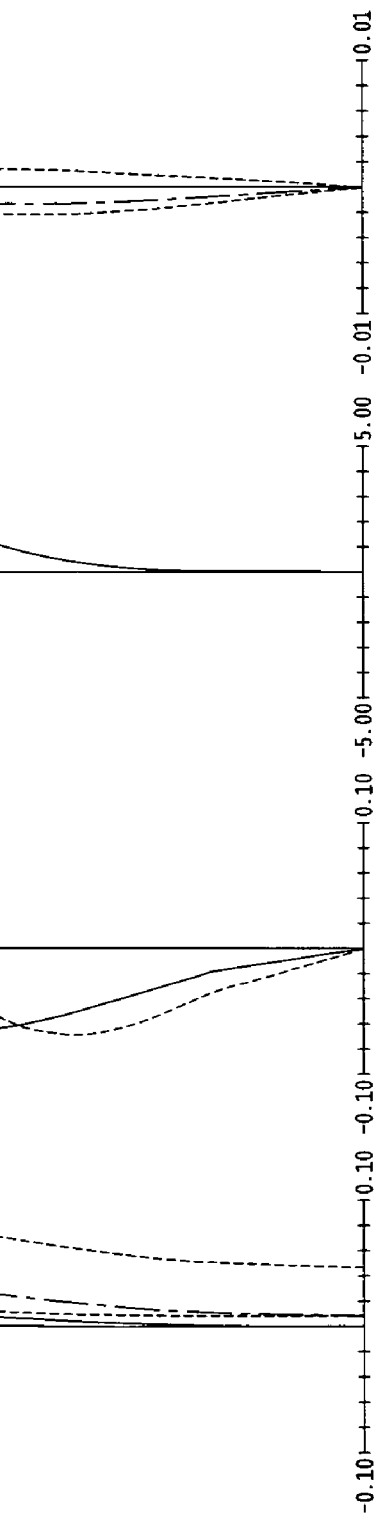

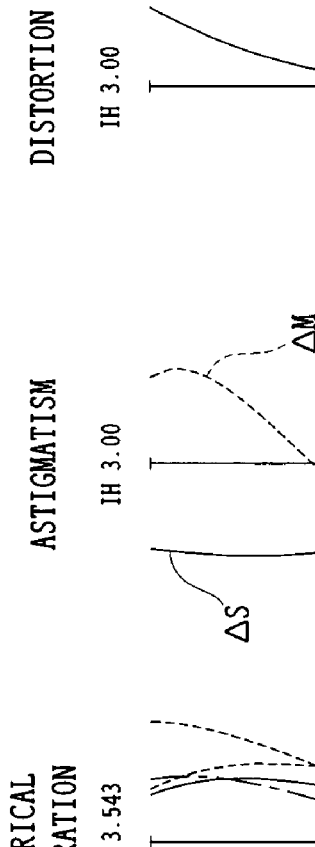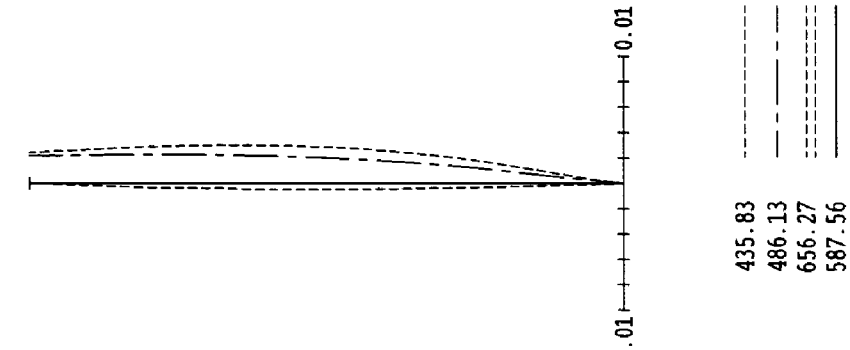

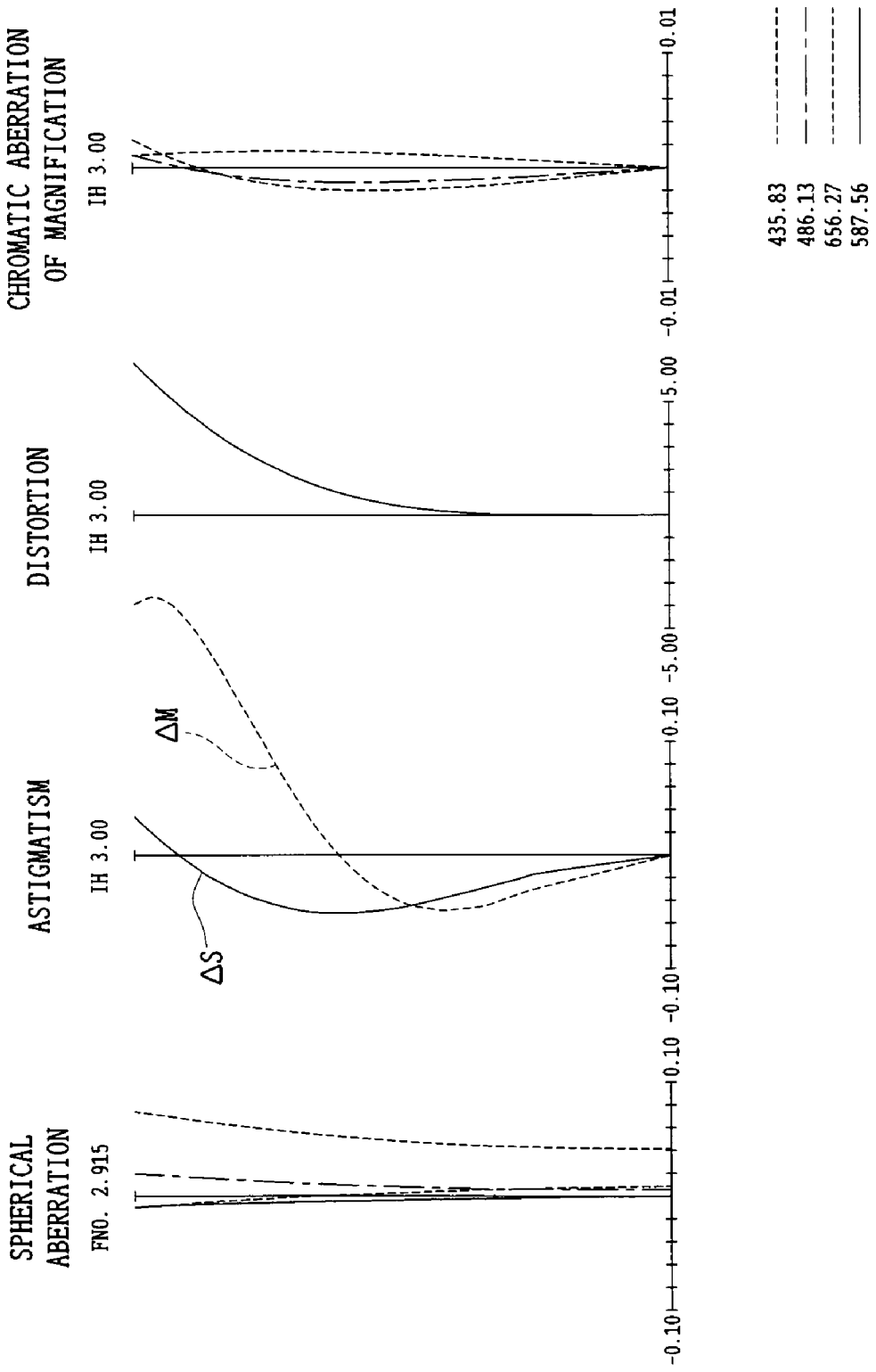

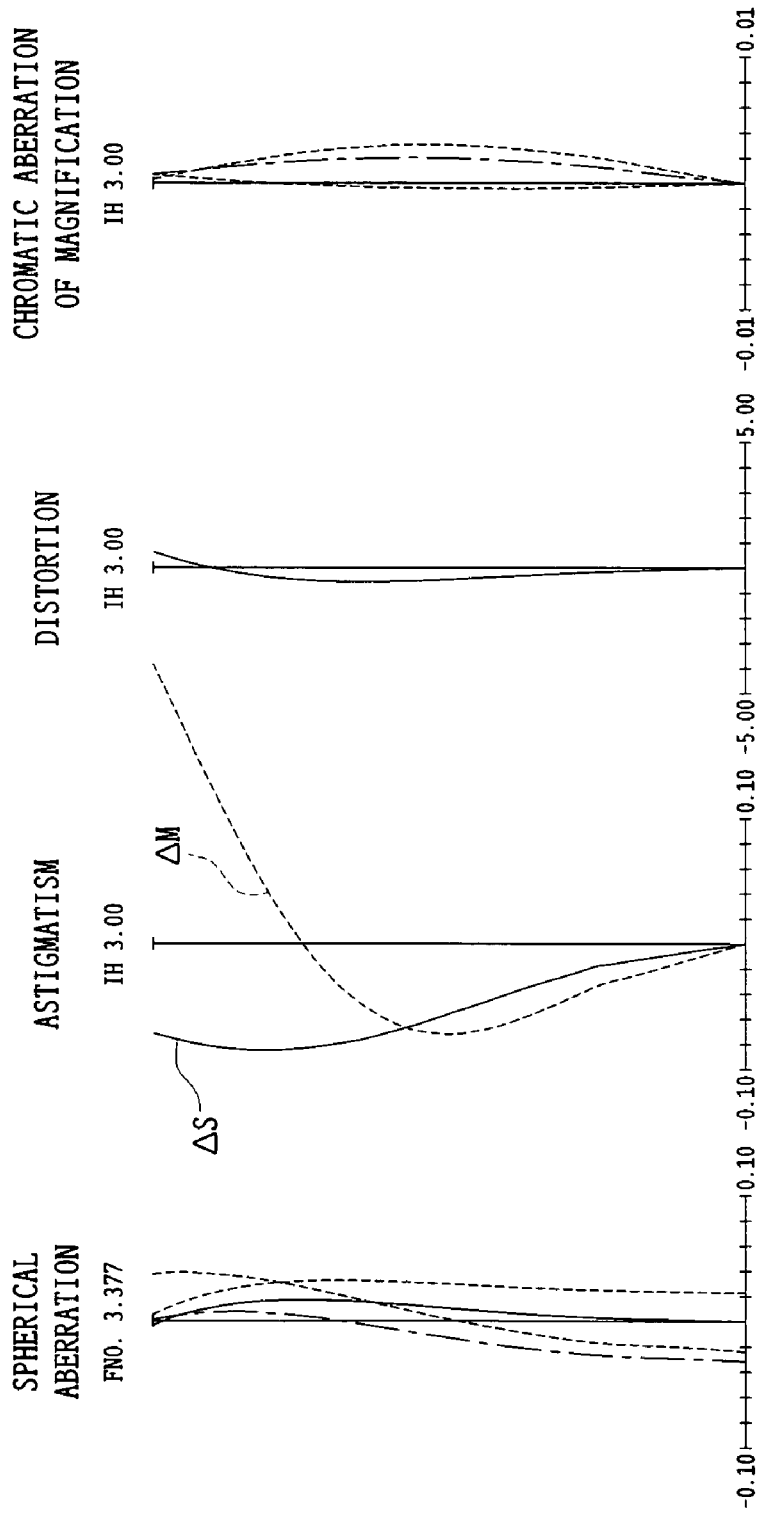

ZOOM LENS

BACKGROUND OF THE INVENTION

1. Field of the Invention

The present invention relates to a zoom lens, specifically to a zoom lens for electronic image capture apparatuses such as video cameras and digital cameras that achieve slim design in depth.

2. Description of Related Art

In recent years, as the next-generation cameras to replace silver halide 35 mm film (135 format) cameras, digital cameras (electronic cameras) have attracted a considerable attention. The digital cameras have come to contain many categories in a wide range from high-performance models for professional use to popular portable models. Under the circumstances, while slim design of a camera is one of important challenges, the thickness of an optical system, particularly that from the most object-side surface of a zoom lens to an image pickup surface has conventionally laid a greatest obstacle to reduction in depth of the camera. The recent major technique for slim design of a camera body is to employ a so-called collapsible lens barrel, which causes an optical system to protrude from the camera body in photographing while to be folded up into the camera body when carried. As an example of the optical system that could effectively contribute to thin design by employing the collapsible lens barrel, there is a type that includes a first unit having a negative refractive power and a second unit having a positive refractive power, which both are shifted in a magnification change (for example, refer to Japanese Patent Application Preliminary Publication (KOKAI) No. Hei 11-194274, Japanese Patent Application Preliminary Publication (KOKAI) No. Hei 11-287953, and Japanese Patent Application Preliminary Publication (KOKAI) No. 2000-9997).

SUMMARY OF THE INVENTION

A zoom lens according to the present invention includes a lens unit G1 having a negative refractive power and an aperture stop arranged on the image side of the lens unit G1. The lens unit G1 has, at the most object-side position, an optical element having a reflecting surface for folding a path of rays, and remains fixed in a magnification change. The position of the aperture stop remains fixed in reference to the image surface in the magnification change. The ray-entering surface of the optical element has an aspherical surface concave toward the object side that exerts a weaker power for divergence at a position farther from the optical axis.

Also, the zoom lens according to the present invention preferably further includes a lens unit G2 having a positive refractive power arranged between the lens unit G1 and the aperture stop, wherein the lens unit G2 shifts only in one direction in a magnification change from the wide-angle end to the telephoto end with an object point at an infinite distance being in focus and satisfies the following condition:

$$0.45 < \log \gamma_B / \log \gamma < 0.85$$

where $f_T$ is a focal length of the entire system of the zoom lens at the telephoto end, $f_W$ is a focal length of the entire system of the zoom lens at the wide-angle end, $\gamma = f_T/f_W$, and $\gamma_B$ is a magnification of the lens unit G2 at the telephoto end divided by a magnification of the lens unit G2 at the wide-angle end.

Also, the zoom lens according to the present invention preferably includes, in order from the aperture stop toward the image side, a lens unit G3 having a negative refractive power and a lens unit G4 having a positive refractive power, which are arranged adjacent to each other. The distance between the lens unit G3 and the lens unit G4 is smaller at the telephoto end than at the wide-angle end, under the condition where the magnification is changed from the wide-angle end to the telephoto end with an object point at an infinite distance being in focus.

Also, the zoom lens according to the present invention preferably is such that the position of the lens unit G4 is more image-side at the telephoto end than at the wide-angle end under the condition where the magnification is changed from the wide-angle end to the telephoto end with an object point at an infinite distance being in focus.

Also, the zoom lens according to the present invention preferably includes a lens unit that is arranged on the image side of the aperture stop and that performs focusing.

Also, the zoom lens according to the present invention preferably includes a lens unit that has a positive refractive power and that has an aspherical surface.

Also, the zoom lens according to the present invention preferably includes a lens unit that has a positive refractive power and that has a cemented lens component.

Also, the zoom lens according to the present invention preferably is such that the lens unit consists of a cemented lens component.

Also, the zoom lens according to the present invention preferably satisfies the following condition:

$$0.45 < e/L < 1.2$$

where L is a diagonal length of an effective image-pickup region of an image pickup element, and e is an equivalent length in the air to the length along the optical axis from the ray-entering surface to the ray-exiting surface of the optical element.

Also, the zoom lens according to the present invention preferably is such that the optical element is a prism that satisfies the following condition:

$$1.45 < n_{pri}$$

where $n_{pri}$ is a refractive index (for d-line rays) of the medium of the prism.

Also, the zoom lens according to the present invention preferably further includes a lens unit G2 and satisfies the following condition:

$$0.85 < -\beta_{Rt} < 2.0$$

where $\beta_{Rt}$ is a compound magnification of elements in the section on and after the lens unit G2 at the telephoto end (for the infinite-distance object point).

Also, the zoom lens according to the present invention preferably further includes a lens unit G2 and a lens unit G3, and satisfies the following condition:

$$0.2 < -M_3/M_2 < 0.75$$

where $M_2$ is an amount of shift of the lens unit G2 in a magnification change from the wide-angle end to the telephoto end with an object point at an infinite distance being in focus, and $M_3$ is an amount of shift of the lens unit G3 in a magnification change from the wide-angle end to the telephoto end with an object point at an infinite distance being in focus.

Also, the zoom lens according to the present invention preferably has a lens subunit and satisfies the following condition:

$$0 < f_{11}/f_{12} < 1.6$$

where $f_{11}$, is a focal length of a prism in the lens unit G1, and $f_{12}$ is a focal length of the lens subunit.

Also, the zoom lens according to the present invention preferably has an optical member or optical thin film that satisfies the following conditions:

$$\tau_{600}/\tau_{550} \geq 0.8$$

$$\tau_{700}/\tau_{550} \leq 0.08$$

where $\tau_{550}$ is a transmittance of the optical member or optical thin film at the wavelength 550 nm, $\tau_{600}$ is a transmittance of the optical member or optical thin film at the wavelength 600 nm, and $\tau_{700}$ is a transmittance of the optical member or optical thin film at the wavelength 700 nm.

Also, the zoom lens according to the present invention preferably has an optical member or optical thin film that satisfies the following conditions:

$$\tau_{400}/\tau_{550} \leq 0.08$$

$$\tau_{440}/\tau_{550} \geq 0.4$$

where $\tau_{400}$ is a transmittance of the optical member or optical thin film at the wavelength 400 nm, $\tau_{440}$ is a transmittance of the optical member or optical thin film at the wavelength 440 nm, and $\tau_{550}$ is a transmittance of the optical member or optical thin film at the wavelength 550 nm.

Also, the zoom lens according to the present invention preferably forms an object image on an electronic image pickup element arranged on the image surface, has optical lowpass filter(s), and satisfies the following conditions:

when $a < 4 \mu m$, $0.08a < t_{LPF} < 0.16a$ when $a < 3 \mu m$, $0.075a < t_{LPF} < 0.15a$ where a ($\mu m$) is a horizontal pixel pitch of the electronic image pickup element, and $t_{LPF}$ (mm) is a thickness of the thickest optical lowpass filter having one crystal axis that forms an angle with the optical axis of the zoom lens in a range from 35 deg. to 55 deg., as measured along the optical axis.

Also, in the zoom lens according to the present invention, the lens unit G3 preferably has a fixedly positioned lens component and a moving lens component in a magnification change from the wide-angle end to the telephoto end.

Also, in the zoom lens according to the present invention, the optical element preferably is a prism.

The present invention can provide a zoom lens that takes no set-up time for usable state of a camera (time for lens protrusion) as in the case of a collapsible lens barrel, that is preferable in view of water-proof and dust-proof performance, and that can form an extremely thin camera in the depth direction, while achieving high optical specification performance itemized into zoom ratio, field angle, F-number, aberration smallness and so forth. In addition, the depth can be further reduced by constructing the zoom lens as an optical system in which a stop or a shutter device is not shifted.

The features and the advantages of the present invention will become apparent from the following detailed description of the preferred embodiments when taken in conjunction with the accompanying drawings.

BRIEF DESCRIPTION OF THE DRAWINGS

FIG. 1 is a sectional view taken along the optical axis to show the optical configuration in the first embodiment of the zoom lens according to the present invention. It illustrates the state where an object point at an infinite distance is in focus at the wide-angle end with the path of rays being folded.

FIGS. 3A, 3B, 3C and 3D are diagrams to show spherical aberration, astigmatism, distortion and chromatic aberration of magnification, respectively, of the zoom lens according to the first embodiment at the wide-angle end under the condition where the object point at the infinite distance is in focus.

FIGS. 4A, 4B, 4C and 4D are diagrams to show spherical aberration, astigmatism, distortion and chromatic aberration of magnification, respectively, of the zoom lens according to the first embodiment at the intermediate position under the condition where the object point at the infinite distance is in focus.

FIGS. 5A, 5B, 5C and 5D are diagrams to show spherical aberration, astigmatism, distortion and chromatic aberration of magnification, respectively, of the zoom lens according to the first embodiment at the telephoto end under the condition where the object point at the infinite distance is in focus.

FIGS. 6A, 6B, 6C and 6D are diagrams to show spherical aberration, astigmatism, distortion and chromatic aberration of magnification, respectively, of the zoom lens according to the first embodiment at the wide-angle end under the condition where an object point at a near distance is in focus.

FIGS. 7A, 7B, 7C and 7D are diagrams to show spherical aberration, astigmatism, distortion and chromatic aberration of magnification, respectively, of the zoom lens according to the first embodiment at the intermediate position under the condition where the object point at the near distance is in focus.

FIGS. 8A, 8B, 8C and 8D are diagrams to show spherical aberration, astigmatism, distortion and chromatic aberration of magnification, respectively, of the zoom lens according to the first embodiment at the telephoto end under the condition where the object point at the near distance is in focus.

FIGS. 11A, 11B, 11C and 11D are diagrams to show spherical aberration, astigmatism, distortion and chromatic aberration of magnification, respectively, of the zoom lens according to the second embodiment at the wide-angle end under the condition where the object point at the infinite distance is in focus.

FIGS. 12A, 12B, 12C and 12D are diagrams to show spherical aberration, astigmatism, distortion and chromatic aberration of magnification, respectively, of the zoom lens according to the second embodiment at the intermediate position under the condition where the object point at the infinite distance is in focus.

FIGS. 13A, 13B, 13C and 13D are diagrams to show spherical aberration, astigmatism, distortion and chromatic aberration of magnification, respectively, of the zoom lens according to the second embodiment at the telephoto end under the condition where the object point at the infinite distance is in focus.

FIGS. 14A, 14B, 14C and 14D are diagrams to show spherical aberration, astigmatism, distortion and chromatic aberration of magnification, respectively, of the zoom lens according to the second embodiment at the wide-angle end under the condition where an object point at a near distance is in focus.

FIGS. 15A, 15B, 15C and 15D are diagrams to show spherical aberration, astigmatism, distortion and chromatic aberration of magnification, respectively, of the zoom lens according to the second embodiment at the intermediate position under the condition where the object point at the near distance is in focus.

FIGS. 16A, 16B, 16C and 16D are diagrams to show spherical aberration, astigmatism, distortion and chromatic aberration of magnification, respectively, of the zoom lens according to the second embodiment at the telephoto end under the condition where the object point at the near distance is in focus.

FIGS. 19A, 19B, 19C and 19D are diagrams to show spherical aberration, astigmatism, distortion and chromatic aberration of magnification, respectively, of the zoom lens according to the third embodiment at the wide-angle end under the condition where the object point at the infinite distance is in focus.

FIGS. 20A, 20B, 20C and 20D are diagrams to show spherical aberration, astigmatism, distortion and chromatic aberration of magnification, respectively, of the zoom lens according to the third embodiment at the intermediate position under the condition where the object point at the infinite distance is in focus.

FIGS. 21A, 21B, 21C and 21D are diagrams to show spherical aberration, astigmatism, distortion and chromatic aberration of magnification, respectively, of the zoom lens according to the third embodiment at the telephoto end under the condition where the object point at the infinite distance is in focus.

FIGS. 22A, 22B, 22C and 22D are diagrams to show spherical aberration, astigmatism, distortion and chromatic aberration of magnification, respectively, of the zoom lens according to the third embodiment at the wide-angle end under the condition where an object point at a near distance is in focus.

FIGS. 23A, 23B, 23C and 23D are diagrams to show spherical aberration, astigmatism, distortion and chromatic aberration of magnification, respectively, of the zoom lens according to the third embodiment at the intermediate position under the condition where the object point at the near distance is in focus.

FIGS. 24A, 24B, 24C and 24D are diagrams to show spherical aberration, astigmatism, distortion and chromatic aberration of magnification, respectively, of the zoom lens according to the third embodiment at the telephoto end under the condition where the object point at the near distance is in focus.

FIGS. 27A, 27B, 27C and 27D are diagrams to show spherical aberration, astigmatism, distortion and chromatic aberration of magnification, respectively, of the zoom lens according to the fourth embodiment at the wide-angle end under the condition where the object point at the infinite distance is in focus.

FIGS. 28A, 28B, 28C and 28D are diagrams to show spherical aberration, astigmatism, distortion and chromatic aberration of magnification, respectively, of the zoom lens according to the fourth embodiment at the intermediate position under the condition where the object point at the infinite distance is in focus.

FIGS. 29A, 29B, 29C and 29D are diagrams to show spherical aberration, astigmatism, distortion and chromatic aberration of magnification, respectively, of the zoom lens according to the fourth embodiment at the telephoto end under the condition where the object point at the infinite distance is in focus.

FIGS. 32A, 32B, 32C and 32D are diagrams to show spherical aberration, astigmatism, distortion and chromatic aberration of magnification, respectively, of the zoom lens according to the fourth embodiment at the telephoto end under the condition where the object point at the near distance is in focus.

FIGS. 35A, 35B, 35C and 35D are diagrams to show spherical aberration, astigmatism, distortion and chromatic aberration of magnification, respectively, of the zoom lens according to the fifth embodiment at the wide-angle end under the condition where the object point at the infinite distance is in focus.

FIGS. 36A, 36B, 36C and 36D are diagrams to show spherical aberration, astigmatism, distortion and chromatic aberration of magnification, respectively, of the zoom lens according to the fifth embodiment at the intermediate position under the condition where the object point at the infinite distance is in focus.

FIGS. 37A, 37B, 37C and 37D are diagrams to show spherical aberration, astigmatism, distortion and chromatic aberration of magnification, respectively, of the zoom lens according to the fifth embodiment at the telephoto end under the condition where the object point at the infinite distance is in focus.

FIGS. 39A, 39B, 39C and 39D are diagrams to show spherical aberration, astigmatism, distortion and chromatic aberration of magnification, respectively, of the zoom lens according to the fifth embodiment at the intermediate position under the condition where the object point at the near distance is in focus.

FIGS. 40A, 40B, 40C and 40D are diagrams to show spherical aberration, astigmatism, distortion and chromatic aberration of magnification, respectively, of the zoom lens according to the fifth embodiment at the telephoto end under the condition where the object point at the near distance is in focus.

DETAILED DESCRIPTION OF THE PREFERRED EMBODIMENTS

Figure 2A:
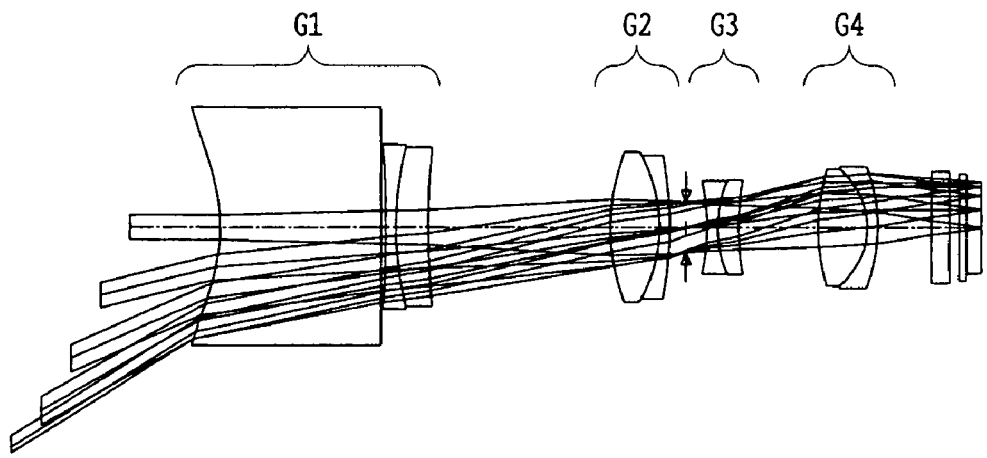
FIGS. 2A, 2B and 2C are sectional views taken along the optical axis to show the optical configuration of the zoom lens according to the first embodiment at the wide-angle end, at the intermediate position, and at the telephoto end, respectively, under the condition where the object point at the infinite distance is in focus.

The embodiments of the present invention are explained below in reference to the drawings. Preceding the explanation, the function and effect of the zoom lens according to the present invention is set forth.

In general, in a case where a path of rays is folded by using an optical element having a reflecting surface, a lens element cannot be arranged in the vicinity of the reflecting surface. As a result, an equivalent length in the air to the length in that portion becomes unnecessarily long, and accordingly, the entrance pupil may be deeper (i.e. the position of the entrance pupil is located farther toward the image side) or a considerable magnification ratio could not be assured. Therefore, a region that excludes other lens elements therefrom, like a vicinity of a reflecting surface, should be filled with a medium having as high a refractive index as possible, for it is important to shorten the equivalent length in the air to the length in that region along the optical axis as much as possible. By this reason, use of a prism as the optical element is preferable. To be specific, it is better that the equivalent length e in the air to the length measured along the optical axis from the ray-entering surface to the ray-exiting surface of the prism satisfies the following condition (1):

$$0.45 < e/L < 1.2 \quad (1)$$

where L is a diagonal length of the effective image pickup region (substantially rectangular) of the image pickup element.

Regarding Condition (1), if the equivalent length e in the air exceeds the upper limit value, optical elements on the object side, including the prism, are liable to be large-sized, which is disadvantageous in view of compensation for aberrations also. In addition, the compound magnification of all lens units excluding the lens unit G1 is lowered, and accordingly, an amount of shift of each lens unit contributing to magnification change should be increased or securing a high zoom ratio is made difficult. Also, if the lower limit value is not reached, bundles of rays contributing to image formation on the margin of an image cannot sufficiently reach the image surface or a ghost is liable to be generated.

It is much preferable that the equivalent length e in the air satisfies the following condition (1'):

$$0.55 < e/L < 1.0 \quad (1')$$

Moreover, it is still much preferable that the equivalent length e in the air satisfies the following condition (1"):

$$0.65 < e/L < 0.8 \quad (1")$$

As long as any of the conditions set forth above is satisfied, one may use a front surface mirror, the reflecting surface of which is bordered by air as the adjacent medium. However, if possible, it is much preferable to use a prism medium with a high refractive index, so as to shorten the equivalent length in the air as much as possible.

It is better that the following condition (2) is satisfied:

$$1.45 < n_{pri} \quad (2)$$

where $n_{pri}$ is a refractive index (for d-line rays) of the medium, in the case where the optical element is a prism.

Although a higher value of refractive index $n_{pri}$ is preferable, if the upper limit value of Condition (2) is exceeded, a ghost by total reflection is liable to be generated. Also, if the lower limit value is not reached, optical elements on the object side, including the prism, are liable to be large-sized, which is disadvantageous in view of compensation for aberrations also. In addition, the compound magnification of all lens units excluding the lens unit G1 is lowered, and accordingly, an amount of shift of each lens unit contributing to magnification change should be increased or securing a high zoom ratio is made difficult. In this way, by arranging, at a most object-side position, a prism that has a light-divergent entrance surface and configuring the lens unit G1 having that prism to remain fixed in a magnification change, a camera can be made thin in the depth direction.

At the same time, consideration should be made to avoid size increase of the lens barrel in the direction of lens diameter at the portion on the image side of the corner of the folded path. For example, if the stop mechanism (in some cases including the shutter mechanism) is shifted in accordance with a magnification change, the light amount control mechanism also should be shifted together, and resultantly, for securing a space for shifting them, the size of the barrel is rendered large in the diameter direction. Therefore, according to the present invention, the position of the stop remains fixed in a magnification change.

However, if the aperture stop is fixed on the object side of the lens unit that greatly contributes to magnification change by shifting in one direction in the magnification change, a variation of F-number in a change from the wide-angle end to the telephoto end becomes extremely large, which is unfavorable. Therefore, it is necessary to arrange, at least on the object side of the fixedly positioned aperture stop, a lens unit contributing to magnification change. That is, it is necessary to arrange, between the lens unit G1 and the aperture stop, a lens unit G2 that is shifted only in one direction in a magnification change from the wide-angle end to the telephoto end. Also, in association with the lens unit G1 having a negative refractive power, the lens unit G2 desirably has a positive refractive power. On the other hand, if an amount of shift of the lens unit G2 is large, the entrance pupil becomes deep, to obstruct formation of a folded path or satisfactory telecentricity on the exit side. Therefore, it is preferable to limit the degree of magnification change from the wide-angle end to the telephoto end to the range expressed in the following condition (3):

$$0.5 < \log\gamma_B/\log\gamma < 1.5 \tag{3}$$

where $\gamma = f_T/f_W$, and $\gamma_B$ is a magnification of the lens unit G2 at the telephoto end divided by a magnification of the lens unit G2 at the wide-angle end.

Regarding Condition (3), if the value of $\log\gamma_B/\log\gamma$ exceeds the upper limit, the entrance pupil becomes deep, to be liable to obstruct formation of a folded path or satisfactory telecentricity on the exit side. If the lower limit is not reached, it is difficult to obtain a large magnification ratio. In a case where the insufficiency of the magnification ratio is compensated for by shifting a lens unit arranged after the aperture stop, the variation of F-number in a change from the wide-angle end to the telephoto end becomes larger as the amount of shift of the lens unit arranged after the aperture stop is greater. Since a reasonable amount of such shift merely causes a little variation of F-number, it is better to arrange a lens unit that shifts only in one direction in a magnification change from the wide-angle end to the telephoto end (a lens unit contributing to magnification change) on the image side of the aperture stop.

It is much preferable that the value of $\log\gamma_B/\log\gamma$ satisfies the following condition (3'):

$$0.6 < \log\gamma_B/\log\gamma < 1.4 \tag{3'}$$

Furthermore, it is still much preferable that the value of $\log\gamma_B/\log\gamma$ satisfies the following condition (3"):

$$0.7 < \log\gamma_B/\log\gamma < 1.3 \tag{3"}$$

Also, regarding the configuration on the image side of the aperture stop, it is preferable to arrange, in order from the object side, a lens unit G3 having a negative refractive power and a lens unit G4 having a positive refractive power. Also, in a magnification change from the wide-angle end toward the telephoto end, it is preferable that at least one of the lens unit G3 and the lens unit G4 is shifted in such a manner that the distance between the lens unit G3 and the lens unit G4 is smaller at the telephoto end than at the wide-angle end. In particular, it is preferable to adopt a shifting manner such that the position of the lens unit G4 is more image side at the telephoto end than at the wide-angle end. Focusing is performed desirably by shifting one of the lens units arranged on the image side of the aperture stop back and forth along the optical axis.

Furthermore, in order to decrease the amount of shift of each lens unit as much as possible to shorten the entire length of the optical system, magnification change is desirably performed with a magnification of a compound system that includes the lens unit G2 and components thereafter being in the vicinity of −1x to satisfy the following condition (4). It is noted that a lower absolute value of the magnification is advantageous in view of compensation for aberrations. Therefore, it is better that the following condition (4) is satisfied at the telephoto end:

$$0.85 < -\beta_{Rt} < 2.0 \tag{4}$$

where $\beta_{Rt}$ is the compound magnification of the optical system formed of the second lens unit and components arranged thereafter, at the telephoto end (for an infinite-distance object point). If the value of $\beta_{Rt}$ exceeds the upper limit or falls below the lower limit, the variation of a relative distance between the lens units becomes large, to render the entire length of the optical system large.

It is much preferable that the value of $\beta_{Rt}$ satisfies the following condition (4'):

$$0.9 < -\beta_{Rt} < 1.8 \tag{4'}$$

Furthermore, it is still much preferable that the value of $\beta_{Rt}$ satisfies the following condition (4"):

$$0.95 < -\beta_{Rt} < 1.6 \tag{4"}$$

In addition, if, on the image side of the aperture stop along the optical path, the lens unit G3 having a negative refractive power and the lens unit G4 having a positive refractive power are arranged adjacent to each other and at least one of the lens units are shifted only toward the image side in a magnification change from the wide-angle end to the telephoto end, a much greater magnification ratio can be assured.

Furthermore, since the lens unit G2, which is positioned on the object side of the aperture stop, and the lens unit G3, which is positioned on the image side of the aperture stop, have refractive powers with opposite signs, they shift in opposite directions in a magnification change. Therefore, it is better that the amounts of shift $M_2$ and $M_3$ of the lens unit G2 and the lens unit G3 in a magnification change from the wide-angle end to the telephoto end with an object point at an infinite distance being in focus form a ratio that satisfies the following condition (5):

$$0.2 < -M_3/M_2 < 0.75 \tag{5}$$

where a shift toward the image side takes a positive value. If the value of $-M_3/M_2$ exceeds the upper limit, the entrance pupil becomes deep, to obstruct formation of a folded path or satisfactory telecentricity on the exit side. On the other hand, if the lower limit is not reached, a variation of F-number in a change from the wide-angle end through the telephoto end becomes large.

It is much preferable that $-M_3/M_2$ satisfies the following condition (5'):

$$0.25 < -M_3/M_2 < 0.7 \tag{5'}$$

Furthermore, it is still much preferable that $-M_3/M_2$ satisfies the following condition (5"):

$$0.3 < -M_3/M_2 < 0.65 \tag{5"}$$

It is better that focusing is performed by any lens unit arranged on the image side of the aperture stop.

Also, it is better that the amounts of shift $M_3$ and $M_4$ of the lens unit G3 and the lens unit G4 in a magnification change from the wide-angle end to the telephoto end with an object point at an infinite distance being in focus form a ratio that satisfies the following condition (6):

$$0.0 < M_4/M_3 < 0.6 \tag{6}$$

If the value of $M_4/M_3$ exceeds the upper limit of condition (6), it is difficult to assure a considerable magnification ratio. If the lower limit is not reached, it is difficult to secure a space for shifting required for focusing.

It is much preferable that the value of $M_4/M_3$ satisfies the following condition (6'):

$$0.1 < M_4/M_3 < 0.5 \tag{6'}$$

It is still much preferable that the value of $M_4/M_3$ satisfies the following condition (6"):

$$0.2 < M_4/M_3 < 0.45 \qquad (6")$$

Also, in a configuration where the lens unit G1 has, on the image side of the prism, a subunit that includes, in order from the object side, a negative lens and a positive lens, off-axis aberrations such as chromatic aberration and distortion can be compensated for. In this case, however, it is necessary to satisfy the following condition (7):

$$0 < f_{11}/f_{12} < 1.6 \qquad (7)$$

where $f_{11}$, and $f_{12}$ are focal lengths of the prism and of the subunit, rerspectively, in the lens unit G1. Condition (7) limits the focal length ratio of the prism to the subunit. If the value of $f_{11}/f_{12}$ exceeds the upper limit, the entrance pupil is liable to be deep. If the lower limit is not reached, a focal length of a system including the lens unit G2 and components thereafter is obliged to be long for the purpose of assuring a certain magnification, to elongate the space for shifting.

It is much preferable that the value of $f_{11}/f_{12}$ satisfies the following condition (7'):

$$0.1 < f_{11}/f_{12} < 1.5 \qquad (7')$$

Furthermore, it is still much preferable that the value of $f_{11}/f_{12}$ satisfies the following condition (7"):

$$0.2 < f_{11}/f_{12} < 1.4 \qquad (7")$$

It is noted that the exit surface of the prism is preferably formed as a plane surface in view of adjustment of decentration. In each type of the prism, the reflecting surface may have a shape other than a plane surface for the purpose of optimizing distribution of paraxial refractive power. Also, it is much preferable to construct the reflecting surface as a deformable mirror, the shape of which is controllable, upon providing a control system that can freely change the shape of the reflecting surface, thereby to compensate for fluctuation of focal position or of aberrations caused in a magnification change, to perform focusing or to change magnification. Also, in another configuration, the reflecting optical element may be constructed as a prism a plane face portion of which is cemented to a planar-concave lens or as a prism having a transmitting or reflecting surface for effective rays that is shaped as a curved surface.

Also, in consideration of tradeoff between the level of compensation for distortion and the size of the electronic image capture apparatus to be achieved, a positive lens having a weak power may be added at the most object-side position. In this case, the subunit in the lens unit G1 is dispensable. Also, while the prism of the lens unit G1 always is fixed, the subunit may be constructed to be movable since it can be shifted relatively easily. In this case, it is better that the subunit shifts, in a magnification change, drawing a locus that is convex toward the image side. Also, for size reduction of the lens, decreasing the number of constituent lenses and the thickness of each lens element is important. However, these requirements tend to spoil versatility regarding compensation for Seidel aberrations and chromatic aberrations, and accordingly make it difficult to perform compensation. Regarding Seidel aberrations, in order to compensate for fluctuation of aberration in a magnification change and for off-axis residual aberration over the entire range of magnification change, it is effective to use an aspherical surface in each lens unit having a positive refractive power. In particular, the aspherical surface is preferably applied to a positive lens element. Regarding chromatic aberrations, in order to compensate for axial aberration and chromatic aberration of magnification over the entire range of magnification change, it is desirable that every lens unit having a positive refractive power includes a cemented lens component. In view of reduction in number of lenses, it is better that every lens unit having a positive refractive power consists of a single cemented-lens component.

The zoom lens according to the present invention is suitable for an image capture apparatus using an electronic image pickup element. The electronic image capture apparatus is to convert a picture picked up by the electronic image pickup element into electric signals and to record the signals on a storage medium via various image processing steps. Therefore, it is easy to correct image distortion caused by distortion aberration in the image processing. In correction, the following conditions are desirably satisfied:

1. In the case of barrel distortion: in reference to the magnification at the image height corresponding to a length in a range from a half to a quarter of the short side of the effective image-pickup region (approximately rectangular), distortion at the remaining image heights is corrected.

2. In the case of pincushion distortion: in reference to the magnification at the image height corresponding to a length in a range from a half to a quarter of the diagonal of the effective image-pickup region (approximately rectangular), distortion at the remaining image heights is corrected.

3. In the case where distortion at image heights in a range from the image center to the half the diagonal length takes both of plus and minus values, no correction is made.

In general, a large barrel distortion appears at the wide-angle end and a large pincushion distortion appears at the telephoto end. Thus, by using this method, a zoom ratio practically greater than the focal length ratio can be obtained.

The measures to achieve thin design of the zoom lens section while keeping good image performance are provided as described above.

Now, description will be made of measures to achieve thin design of filters and the like. In an electronic image capture apparatus, an infrared absorption filter having a certain thickness usually is inserted on the object side of the image pickup element so that infrared light should not be incident on the image pickup surface. According to the present invention, in order to shorten or thin the optical system, this filter is replaced by a coating having no substantial thickness. Whereby, the secondary effect indicated below is obtained. That is, in a case where a near-infrared sharp cut coat achieving a light transmittance greater than 80% at the wavelength 600 nm and a light transmittance smaller than 8% at the wavelength 700 nm is arranged on the object side of the image pickup element, which is behind the zoom lens system, the light transmittance in the near-infrared region, or for light containing wavelengths greater than 700 nm, is lower with a resultant, relatively high transmittance on the red side than in a case where an absorption type filter is used. As a result, magenta shift tendency of the cyan side, which is a defect of a solid-state image sensor such as a CCD that has a complementary-color mosaic filter, can be moderated by gain control, so that color representation as good as with a solid-state image sensor such as a CCD that has primary color filters is achieved. Also, not limited to the complementary to the primary colors, color representation for those having intense reflectance in the near-infrared region such as plants and human skin can be improved.

$$\tau_{600}/\tau_{550} \geq 0.8$$

(better . . . greater than 0.85, best . . . greater than 0.9)

$$\tau_{700}/\tau_{550} \leq 0.08$$

(better . . . smaller than 0.05, best . . . smaller than 0.03)

Another defect of the solid-state image sensor such as a CCD is that its sensitivity to the wavelength 550 nm in the near-ultraviolet region is considerably higher than that of human eyes. This feature also makes color bleeding at an edge in an image conspicuous. In particular, in a case where the optical system is small, the power of each lens unit or lens element tends to increase, and accordingly, easily generates higher-order chromatic aberrations, which are extremely difficult to be compensated for even by an ordinary vitric material. Here, if an absorbing body or reflecting body that has a ratio of the transmittance ($\tau_{400}$) at the wavelength 400 nm to that ($\tau_{550}$) at the wavelength 550 nm smaller than 0.08 and a ratio of the transmittance ($\tau_{440}$) at the wavelength 440 nm to that ($\tau_{550}$) at the wavelength 550 nm greater than 0.4 is inserted in the path of rays, we can considerably reduce noise such as color bleeding without dropping wavelength regions that are necessary for color representation (i.e. maintaining good color representation).

$$\tau_{400}/\tau_{550} \geq 0.08$$

(better . . . smaller than 0.06, best . . . smaller than 0.04)

$$\tau_{440}/\tau_{550} \geq 0.4$$

(better . . . greater than 0.5, best . . . greater than 0.6)

It is noted that these filters are preferably disposed between the imaging optical system (zoom lens) and the image pickup element.

On the other hand, with a high energy of transmitted light therethrough, the complementary-color filter achieves practically higher sensitivity than a CCD with primary color filters, and is advantageous in view of image definition also. Therefore, use of a complementary-color filter is much advantageous in the case where a compact CCD is used.

In order to shorten or thin the optical system, the optical lowpass filter, which is another filter, also preferably is made as thin as possible. In general, an optical lowpass filter utilizes birefringence function of a uniaxial crystal such as a quartz crystal. Here, in a case where the system includes a plurality of or a sole crystal optical lowpass filter(s) each having a single crystal axis that forms an angle with the optical axis of the zoom lens in a range from 35 deg. to 55 deg. with projected images of the crystal axes on the image surface being oriented in different directions, it is preferable that the following conditions are satisfied:

when a<4 µm, $0.08a < t_{LPF} < 0.16a$ when a<3 µm, $0.075a < t_{LPF} < 0.15a$ where a (µm) is a horizontal pixel pitch of the electronic image pickup element, and $t_{LPF}$ (mm) is a thickness of the thickest optical lowpass filter having one crystal axis that forms an angle with the optical axis of the zoom lens in a range from 35 deg. to 55 deg., as measured along the optical axis.

The thickest in the optical lowpass filter constructed of one or a plurality of filter leaves is designed to have an approximate thickness of a/5.88 (mm) so that contrast at the Nyquist limit frequency is theoretically zero. If the leaf is thicker than this value, while being effective for preclusion of false signals such as moiré fringes, it cannot make the most of the resolution of the image pickup element. If the filter is thinner than this value, it cannot sufficiently eliminate false signals such as moiré fringes. However, false signals such as moiré fringes are deeply related to imaging performance of a photographing lens such as a zoom lens. If the imaging performance is high, since false signals such as moiré fringes are easily generated, a rather thick optical lowpass filter is preferable. In the opposite case, a rather thin optical lowpass filter is preferable.

On the other hand, as the pixel pitch decreases, the contrast of frequency components larger than the Nyquist limit decreases due to diffraction in the imaging lens system, and accordingly generation of false signals such as moiré fringes decreases. Therefore, constructing the optical lowpass filter to be thinner than a/5.88 (mm) by several to several tens percents rather improves contrast in spatial frequencies smaller than the frequency corresponding to the Nyquist limit and thus is preferable.

It is more effective if the following conditions (8') are satisfied:

when a<4 µm, $0.075a < t_{LPF} < 0.15a$     (8')

when a<3 µm, $0.07a < t_{LPF} < 0.14a$     (8')

Furthermore, it is still more effective if the following conditions (8") are satisfied:

when a<4 µm, $0.07a < t_{LPF} < 0.14a$     (8")

when a<3 µm, $0.065a < t_{LPF} < 0.13a$     (8")

In the case where a<4 µm, fabricating too thin an optical lowpass filter is difficult. For this situation, there is another measure to set to be high a spatial frequency (cutoff frequency) at which contrast is zero, even if the filter is not so thin, or even if the upper limit of Conditions (8), (8') or (8") is exceeded. According to this measure, an angle formed by the crystal axis of the optical lowpass filter with the optical axis of the zoom lens is set in a range from 15 deg. to 35 deg. or a range from 55 deg. to 75 deg. In each of these ranges, separation between ordinary ray and extraordinary ray of incident light is smaller than at an angle about 45 deg. At the angle 0 deg. or the angle 90 deg., no separation occurs (in the case of 90 deg., however, phase difference is caused by difference in velocity between the ordinary and extraordinary rays: principle of λ/4-wave plate). In some cases, the lowpass filter may be omitted.

As described above, if the pixel pitch is small, since imaging performance at a high spatial frequency corresponding to the pixel pitch is deteriorated as affected by diffraction, it is difficult to set a large value of F-number. Therefore, the condition of the aperture stop as applied to a camera may be limited to two values, that is, a value at the open position where deterioration by geometrical aberrations is large and a value close to the diffraction limit. In this case, the optical lowpass filter is dispensable.

In particular, in the case where the pixel pitch is small and the best imaging performance is assured at the open position, we can use an aperture stop having a fixed inside diameter, without employing an aperture stop having a variable inside diameter or exchange of aperture stops having different inside diameters for regulating size of a beam of rays incident on the image surface. In this case, the configuration in which at least one of the lens surfaces adjacent to the aperture stop is convex toward the aperture stop with one of the adjacent lens surfaces protruding from the inside space of the aperture stop saves an extra space for the stop, to contribute to a shortened entire length of the optical system. Also, it is desirable to arrange an optical element (preferably with both of the entrance surface and the exit surface being planar) having a transmittance smaller than 90% or a means to perform replacement with another optical element having a different transmittance in a space containing the optical axis separated from the aperture stop by at least one lens surface.

Alternatively, the configuration is made so that a plurality of apertures each with a fixed aperture diameter are provided and one of them is inserted in the path of rays between the most image-side lens surface of the first unit and the most object-side lens surface of the third unit. This configuration can realize an electronic image capture apparatus in which illuminance on the image surface is controllable by replacing the aperture with an aperture stop with a different diameter. In this case, some of the plurality of apertures are provided with media having transmittances different from each other and smaller than 80% for light of the wavelength 550 nm, to perform light amount control.

Alternatively, in a case where adjustment is made so that amount of light is in proportion to an F-number that satisfies a ($\mu$m)/F-number<0.4, it is better that the electronic image capture apparatus has media having transmittances different from each other and smaller than 80% for light of the wavelength 550 nm. For example, while these media are kept out or a dummy medium having a transmittance greater than 91% for light of the wavelength 550 nm is used from the open value to the limit value of the condition above, in the range specified by the condition above, light amount control is preferably made by an ND filter or the like, not by decreasing diameter of the aperture stop to such a size where diffraction affects.

Also, a plurality of aperture stops each having a smaller aperture diameter in reverse proportion to a larger F value should be prepared. Also, optical lowpass filters having different frequency characteristics may be arranged in their apertures. In this case, since deterioration by diffraction increases according as the aperture is narrowed, it is preferable to set a higher frequency characteristic of the optical lowpass filter for a smaller aperture diameter.

Regarding the relation between the open F value at the wide-angle end and the pixel pitch a$\mu$m employed, in the case where F>a is satisfied, the optical lowpass filter is dispensable. That is, media in the path of rays between the zoom lens system and the image pickup element may be limited to air or noncrystalline media. Because of deterioration of imaging performance caused by diffraction and geometrical aberrations, there scarcely are frequency components that could generate aliasing.

In reference to the drawings, the embodiments of the present invention are described below. Regarding each embodiment, a view illustrating a path of rays as folded is shown only for the condition where an object point at an infinite distance is in focus at the wide-angle end.

First Embodiment

Figure 2B:
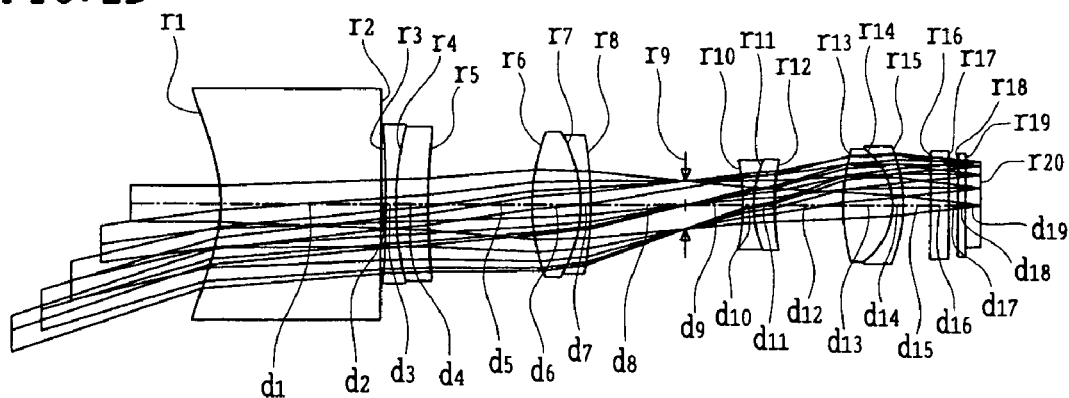
Figure 2C:
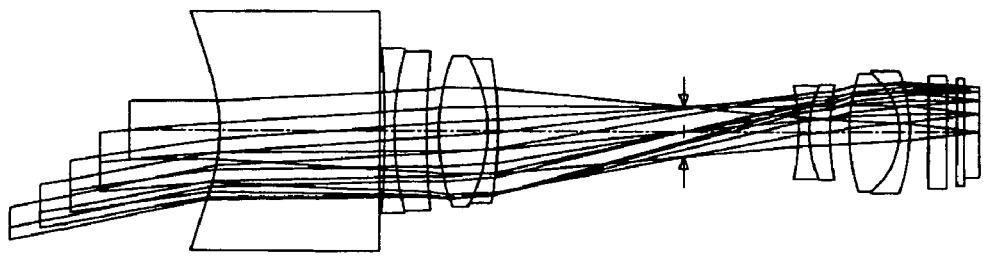

FIG. 1 is a sectional view taken along the optical axis to show the optical configuration in the first embodiment of the zoom lens according to the present invention. It illustrates the state where an object point at an infinite distance is in focus at the wide-angle end with the path of rays being folded. FIG. 2A–2C are sectional views taken along the optical axis to show the optical configuration of the zoom lens according to the first embodiment under the condition where the object point at an infinite distance is in focus. FIG. 2A, FIG. 2B, and FIG. 2C show the states at the wide-angle end, at the intermediate position, and at the telephoto end, respectively. FIGS. 3 through 5 are diagrams that show spherical aberration, astigmatism, distortion, and chromatic aberration of magnification of the zoom lens according to the first embodiment under the condition where the object point at an infinite distance is in focus. FIG. 3, FIG. 4 and FIG. 5 show performance at the wide-angle end, at the intermediate position, and at the telephoto end, respectively. FIGS. 6 through 8 are diagrams that show spherical aberration, astigmatism, distortion, and chromatic aberration of magnification of the zoom lens according to the first embodiment under the condition where an object point at a near distance is in focus. FIG. 6, FIG. 7 and FIG. 8 show performance at the wide-angle end, at the intermediate position, and at the telephoto end, respectively.

In FIG. 1, the reference symbol I denotes an image pickup surface of a CCD, which is an electronic image pickup element, the reference symbol CG denotes a CCD cover glass shaped as a plane parallel plate, and the reference symbol LPF denotes an optical lowpass filter. A zoom lens according to the present invention, the optical lowpass filter LPF, the cover glass CG, and the image pickup surface I are arranged in this order from the object side.

The zoom lens of the first embodiment has, in order from the object side, a first lens unit G1, a second lens unit G2, an aperture stop S, a third lens unit G3, and a fourth lens unit G4.

The first lens unit G1 is composed of, in order from the object side, a prism P having a reflecting surface RF to bend the path of rays toward the object side and a ray-entering surface IF having an aspherical surface that is concave toward the object side and that exerts a weaker power for divergence at a position thereon father from an optical axis, and a rear-side subunit having a negative refractive power, and has a negative refractive power in its entirety.

The rear-side subunit is composed of, in order from the object side, a biconcave negative lens $L1_1$, and a positive meniscus lens $L1_2$ cemented to the biconcave negative lens $L1_1$ and directing the convex surface thereof toward the object side.

The prism P is configured as a reflecting prism to bend the path of rays by 90 deg.

It is noted that the aspect ratio of the effective image pickup region in each embodiment of the present invention is 3:4, and that the path of rays is bent in the horizontal direction.

The second lens unit G2 is composed of a cemented lens having, in order from the object side, a biconvex positive lens $L2_1$ and a negative meniscus lens $L2_2$, and has a positive refractive power in its entirety.

The third lens unit G3 is composed of a cemented lens having, in order from the object side, a biconcave negative lens $L3_1$ and a positive meniscus lens $L3_2$.

The fourth lens unit G4 is composed of a cemented lens having, in order from the object side, a biconvex positive lens $L4_1$ and a negative meniscus lens $L4_2$.

In a magnification change from the wide-angle end to the telephoto end under the condition where the object point at infinite distance is in focus, positions of the first lens unit G1 and the aperture stop S are fixed, the second lens unit G2 shifts only toward the object side, and the third lens unit G3 shifts only toward the image side.

In a focusing operation, the fourth lens unit G4 shifts along the optical axis.

Beside the ray-entering surface IF of the prism P in the first lens unit G1, each of the object-side surface of the biconcave lens L1 in the first lens unit G1, the object-side surface of the biconvex lens $L2_1$ in the second lens unit G2, and the object-side surface of the biconvex positive lens $L4_1$ in the fourth lens unit G4 is provided with an aspherical surface.

Numerical data of the optical members constituting the zoom lens according to the first embodiment are shown below.

In the numerical data of the first embodiment, each of $r_1$, $r_2$, ... denotes a radius of curvature of each lens surface, each of $d_1$, $d_2$, ... denotes a thickness of each lens or air space, each of $n_{d1}$, $n_{d2}$, ... denotes a refractive index of each lens for d-line rays, $v_{d1}$, $v_{d2}$, ... denotes Abbe's number of each lens, Fno. denotes F-number, f denotes a focal length of the entire system, $D_0$ denotes a distance from the object to the first surface.

The shape of an aspherical surface is expressed by the following equation:

$$z = (y^2/r)/[1+\{1-(1+K)(y/r)^2\}^{1/2}] + A_4 y^4 + A_6 y^6 + A_8 y^8 + A_{10} y^{10}$$

where z is taken along the direction of the optical axis, y is taken perpendicular to the optical axis, K is a conical coefficient, and $A_4$, $A_6$, $A_8$, $A_{10}$ are aspherical coefficients.

It is noted that these symbols are commonly used in the numerical data for the later-described embodiments also.

Numerical data 1

$r_1 = -11.2633$ (aspherical)
  $d_1 = 10.8000$    $n_{d1} = 1.52540$    $v_{d1} = 56.25$
$r_2 = \infty$
  $d_2 = 0.3000$
$r_3 = -179.4097$ (aspherical)
  $d_3 = 0.7000$    $n_{d3} = 1.74320$    $v_{d3} = 49.34$
$r_4 = 20.0000$
  $d_4 = 2.2000$    $n_{d4} = 1.84666$    $v_{d4} = 23.78$
$r_5 = 51.6436$
  $d_5 = D_5$
$r_6 = 13.2423$ (aspherical)
  $d_6 = 3.3000$    $n_{d6} = 1.74320$    $v_{d6} = 49.34$
$r_7 = -10.0000$
  $d_7 = 0.7000$    $n_{d7} = 1.84666$    $v_{d7} = 23.78$
$r_8 = -25.6172$
  $d_8 = D_8$
$r_9 = \infty$ (stop)
  $d_9 = D_9$
$r_{10} = -14.2003$
  $d_{10} = 0.7000$    $n_{d10} = 1.48794$    $v_{d10} = 70.23$
$r_{11} = 7.4604$
  $d_{11} = 1.4000$    $n_{d11} = 1.69350$    $v_{d11} = 53.21$
$r_{12} = 16.4097$
  $d_{12} = D_{12}$
$r_{13} = 11.2131$ (aspherical)
  $d_{13} = 3.3000$    $n_{d13} = 1.72916$    $v_{d13} = 54.68$
$r_{14} = -5.0000$
  $d_{14} = 0.7000$    $n_{d14} = 1.846669$    $v_{d14} = 23.78$
$r_{15} = -7.8730$
  $d_{15} = D_{15}$
$r_{16} = \infty$
  $d_{16} = 1.2231$    $n_{d16} = 1.54771$    $v_{d16} = 62.84$
$r_{17} = \infty$
  $d_{17} = 0.6797$
$r_{18} = \infty$
  $d_{18} = 0.5096$    $n_{d18} = 1.51633$    $v_{d18} = 64.14$
$r_{19} = \infty$
  $d_{19} = D_{19}$
$r_{20} = \infty$ (image pickup surface)

Aspherical coefficients

1st surface $K = 0$
$A_2 = 0$    $A_4 = 3.8718 \times 10^{-4}$    $A_6 = -1.1764 \times 10^{-6}$
$A_8 = 7.7116 \times 10^{-9}$ -continued 3rd surface $K = 0$
$A_2 = 0$    $A_4 = -1.3553 \times 10^{-4}$    $A_6 = -3.6036 \times 10^{-7}$
$A_8 = 2.4619 \times 10^{-9}$ 6th surface $K = 0$
$A_2 = 0$    $A_4 = -7.1860 \times 10^{-5}$    $A_6 = 1.0649 \times 10^{-7}$
$A_8 = -1.6663 \times 10^{-9}$ 13th surface $K = 0$
$A_2 = 0$    $A_4 = -3.4687 \times 10^{-4}$    $A_6 = -8.0719 \times 10^{-6}$
$A_8 = 2.5989 \times 10^{-7}$ Zoom Data where $D_0$ (distance from the object to the 1st surface) is $\infty$

|  | wide-angle end | intermediate | telephoto end |
|---|---|---|---|
| f (mm) | 5.00193 | 8.69862 | 14.59929 |
| Fno. | 3.0551 | 3.4577 | 3.7748 |
| $D_0$ | $\infty$ | $\infty$ | $\infty$ |
| $D_5$ | 12.28031 | 6.99655 | 0.79982 |
| $D_8$ | 1.10035 | 6.37742 | 12.58092 |
| $D_9$ | 1.39996 | 3.86126 | 7.72904 |
| $D_{12}$ | 5.31181 | 4.57577 | 1.29890 |
| $D_{15}$ | 3.51675 | 1.79219 | 1.20058 |
| $D_{19}$ | 1.00000 | 0.99895 | 1.00002 | where $D_0$ (distance from the object to the 1st surface) is near (17 cm)

|  | wide-angle end | intermediate | telephoto end |
|---|---|---|---|
| $D_0$ | 169.87900 | 169.65600 | 169.87952 |
| $D_5$ | 12.28000 | 6.99655 | 0.89925 |
| $D_8$ | 1.10000 | 6.37742 | 12.58092 |
| $D_9$ | 1.39900 | 3.86126 | 7.72904 |
| $D_{12}$ | 5.16900 | 4.11593 | 0.05139 |
| $D_{15}$ | 3.65800 | 2.25203 | 2.44809 |
| $D_{19}$ | 1.00000 | 0.99895 | 1.00002 |

Second Embodiment

Figure 9:
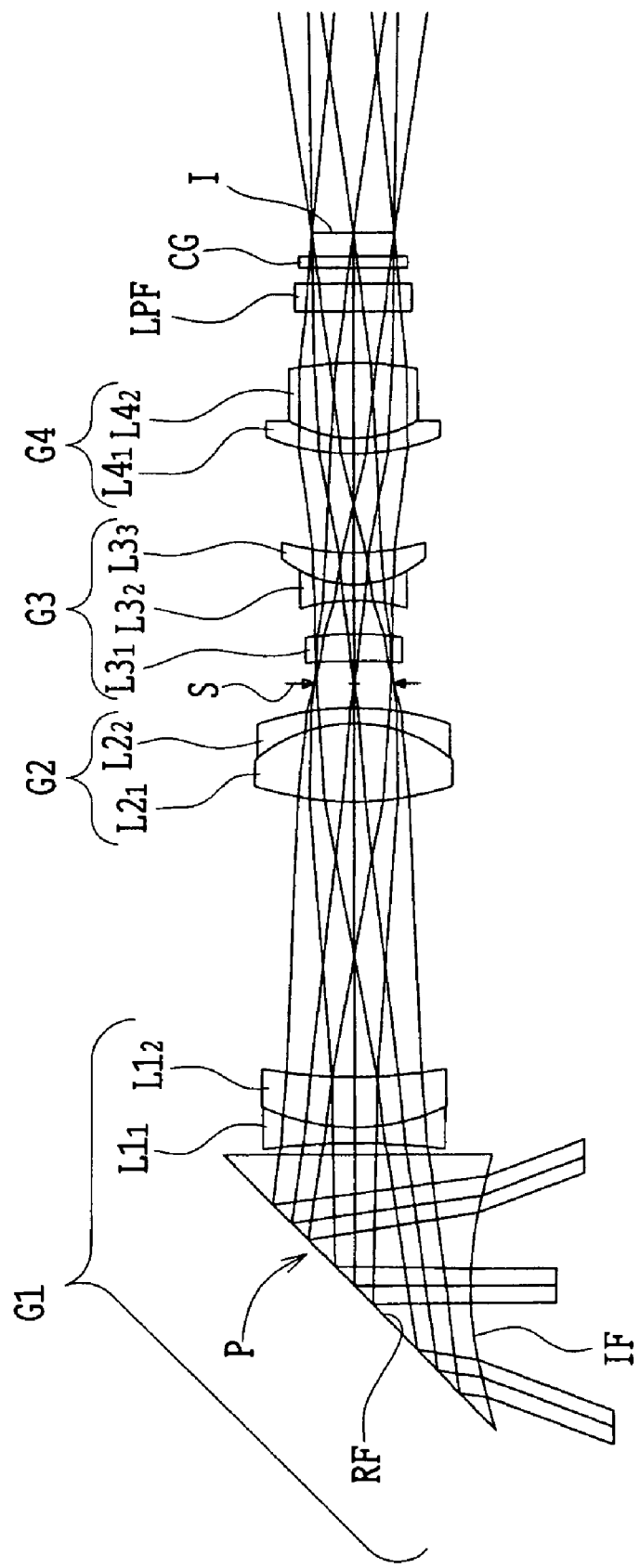
FIG. 9 is a sectional view taken along the optical axis to show the optical configuration in the second embodiment of the zoom lens according to the present invention. It illustrates the state where an object point at an infinite distance is in focus at the wide-angle end with the path of rays being folded.
Figure 10A:
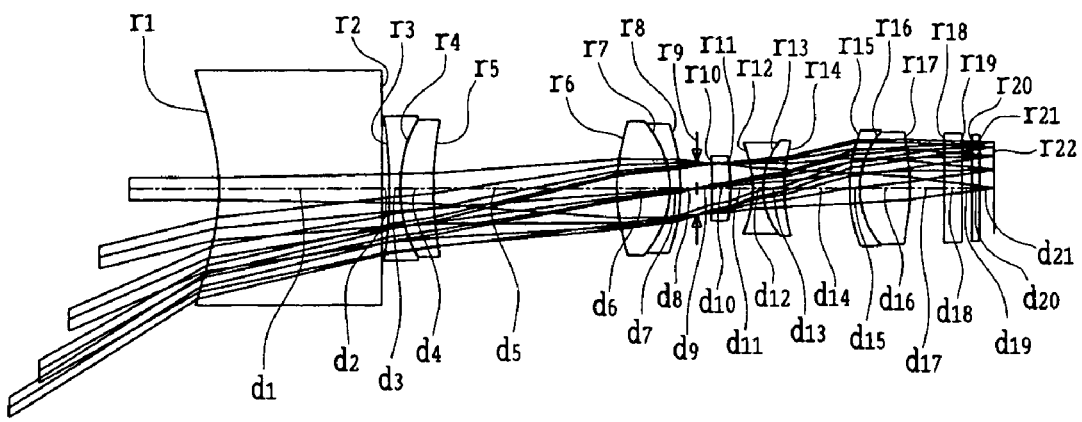
FIGS. 10A, 10B and 10C are sectional views taken along the optical axis to show the optical configuration of the zoom lens according to the second embodiment at the wide-angle end, at the intermediate position, and at the telephoto end, respectively, under the condition where the object point at the infinite distance is in focus.
Figure 10B:
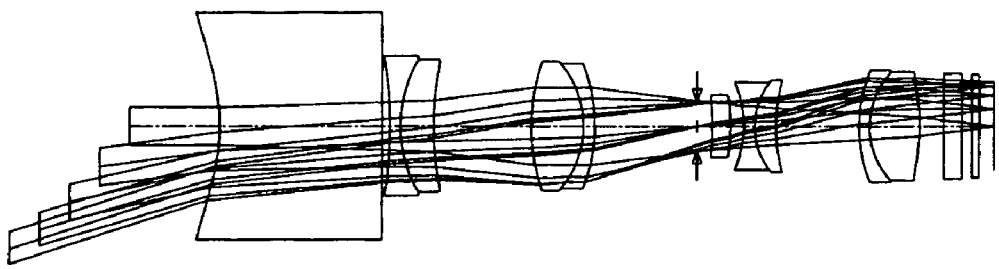
Figure 10C:
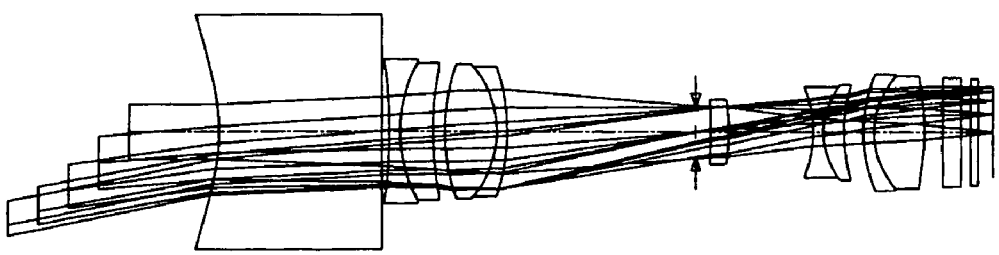

FIG. 9 is a sectional view taken along the optical axis to show the optical configuration in the second embodiment of the zoom lens according to the present invention. It illustrates the state where an object point at an infinite distance is in focus at the wide-angle end with the path of rays being folded. FIG. 10A–10C are sectional views taken along the optical axis to show the optical configuration of the zoom lens according to the second embodiment under the condition where the object point at an infinite distance is in focus. FIG. 10A, FIG. 10B, and FIG. 10C show the states at the wide-angle end, at the intermediate position, and at the telephoto end, respectively. FIGS. 11 through 13 are diagrams that show spherical aberration, astigmatism, distortion, and chromatic aberration of magnification of the zoom lens according to the second embodiment under the condition where the object point at an infinite distance is in focus. FIG. 11, FIG. 12 and FIG. 13 show performance at the wide-angle end, at the intermediate position, and at the telephoto end, respectively. FIGS. 14 through 16 are diagrams that show spherical aberration, astigmatism, distortion, and chromatic aberration of magnification of the zoom lens according to the second embodiment under the condition where an object point at a near distance is in focus. FIG. 14, FIG. 15 and FIG. 16 show performance at the wide-angle end, at the intermediate position, and at the telephoto end, respectively.

In FIG. 9, the reference symbol I denotes an image pickup surface of a CCD, which is an electronic image pickup element, the reference symbol CG denotes a CCD cover glass shaped as a plane parallel plate, and the reference symbol LPF denotes an optical lowpass filter. A zoom lens according to the present invention, the optical lowpass filter LPF, the cover glass CG, and the image pickup surface I are arranged in this order from the object side.

The zoom lens of the second embodiment has, in order from the object side, a first lens unit G1, a second lens unit G2, an aperture stop S, a third lens unit G3, and a fourth lens unit G4.

The first lens unit G1 is composed of, in order from the object side, a prism P having a reflecting surface RF to bend the path of rays toward the object side and a ray-entering surface IF having an aspherical surface that is concave toward the object side and that exerts a weaker power for divergence at a position thereon father from an optical axis, and a rear-side subunit having a negative refractive power, and has a negative refractive power in its entirety.

The rear-side subunit is composed of, in order from the object side, a biconcave negative lens $L1_1$, and a positive meniscus lens $L1_2$ cemented to the biconcave negative lens $L1_1$ and directing the convex surface thereof toward the object side.

The prism P is configured as a reflecting prism to bend the path of rays by 90 deg.

The second lens unit G2 is composed of a cemented lens having, in order from the object side, a biconvex positive lens $L2_1$ and a negative meniscus lens $L2_2$, and has a positive refractive power in its entirety.

The third lens unit G3 is composed of, in order from the object side, a positive meniscus lens $L3_1$, and a cemented lens having a biconcave negative lens $L3_2$ and a positive meniscus lens $L3_3$.

The fourth lens unit G4 is composed of a cemented lens having, in order from the object side, a positive meniscus lens $L4_1$ and a biconvex positive lens $L4_2$.

In a magnification change from the wide-angle end to the telephoto end under the condition where the object point at the infinite distance is in focus, positions of the first lens unit G1, the aperture stop S, and the most object-side lens $L3_1$ of the third lens unit G3 are fixed, the second lens unit G2 shifts only toward the object side, and the cemented lens of the third lens unit G3 shifts only toward the image side.

In a focusing operation, the fourth lens unit G4 shifts along the optical axis.

Beside the ray-entering surface IF of the prism P in the first lens unit G1, each of the object-side surface of the biconcave lens $L1_1$ in the first lens unit G1, the object-side surface of the biconvex lens $L2_1$ in the second lens unit G2, and the image-side surface of the biconvex positive lens $L4_2$ in the fourth lens unit G4 is provided with an aspherical surface.

Numerical data of the optical members constituting the zoom lens according to the second embodiment are shown below.

Numerical data 2

$r_1 = -14.1073$ (aspherical)
$\quad d_1 = 10.8000 \quad\quad n_{d1} = 1.52540 \quad\quad \nu_{d1} = 56.25$
$r_2 = \infty$
$\quad d_2 = 0.5000$
$r_3 = -36.0260$ (aspherical)
$\quad d_3 = 0.7000 \quad\quad n_{d3} = 1.74320 \quad\quad \nu_{d3} = 49.34$
$r_4 = 9.2868$
$\quad d_4 = 2.2000 \quad\quad n_{d4} = 1.84666 \quad\quad \nu_{d4} = 23.78$
$r_5 = 22.5012$
$\quad d_5 = D_5$
$r_6 = 12.7045$ (aspherical)
$\quad d_6 = 3.4909 \quad\quad n_{d6} = 1.69350 \quad\quad \nu_{d6} = 53.21$
$r_7 = -6.5917$
$\quad d_7 = 0.7000 \quad\quad n_{d7} = 1.84666 \quad\quad \nu_{d7} = 23.78$
$r_8 = -12.6815$
$\quad d_8 = D_8$
$r_9 = \infty$ (stop)
$\quad d_9 = 1.0000$
$r_{10} = -29.5849$
$\quad d_{10} = 1.2000 \quad\quad n_{d10} = 1.69350 \quad\quad \nu_{d10} = 53.21$
$r_{11} = -13.7120$
$\quad d_{11} = D_{11}$
$r_{12} = -7.7491$
$\quad d_{12} = 0.7000 \quad\quad n_{d12} = 1.51742 \quad\quad \nu_{d12} = 52.43$
$r_{13} = 4.8702$
$\quad d_{13} = 1.4000 \quad\quad n_{d13} = 1.77250 \quad\quad \nu_{d13} = 49.60$
$r_{14} = 11.1717$
$\quad d_{14} = D_{14}$
$r_{15} = 10.0843$
$\quad d_{15} = 0.7000 \quad\quad n_{d15} = 1.84666 \quad\quad \nu_{d15} = 23.78$
$r_{16} = 5.6491$
$\quad d_{16} = 3.3000 \quad\quad n_{d16} = 1.69350 \quad\quad \nu_{d16} = 53.21$
$r_{17} = -12.5842$ (aspherical)
$\quad d_{17} = D_{17}$
$r_{18} = \infty$
$\quad d_{18} = 1.2231 \quad\quad n_{d18} = 1.54771 \quad\quad \nu_{d18} = 62.84$
$r_{19} = \infty$
$\quad d_{19} = 0.6795$
$r_{20} = \infty$
$\quad d_{20} = 0.5096 \quad\quad n_{d20} = 1.51633 \quad\quad \nu_{d20} = 64.14$
$r_{21} = \infty$
$\quad d_{21} = 0.9991$
$r_{22} = \infty$ (image pickup surface)

Aspherical coefficients

1st surface $K = 0$
$A_2 = 0 \quad\quad A_4 = 2.4392 \times 10^{-4} \quad\quad A_6 = -5.5539 \times 10^{-7}$
$A_8 = 1.0970 \times 10^{-9} \quad\quad A_{10} = 0$ 3rd surface $K = 0$
$A_2 = 0 \quad\quad A_4 = -1.3553 \times 10^{-4} \quad\quad A_6 = -3.6036 \times 10^{-7}$
$A_8 = 2.4619 \times 10^{-9} \quad\quad A_{10} = 0$ 6th surface $K = 0$
$A_2 = 0 \quad\quad A_4 = -1.5318 \times 10^{-4} \quad\quad A_6 = -4.4553 \times 10^{-7}$
$A_8 = 3.9368 \times 10^{-8} \quad\quad A_{10} = 0$ 17th surface $K = 0$
$A_2 = 0 \quad\quad A_4 = 7.3675 \times 10^{-4} \quad\quad A_6 = 2.8684 \times 10^{-5}$
$A_8 = -5.3416 \times 10^{-7} \quad\quad A_{10} = 0$ Zoom Data where $D_0$ (distance from the object to the 1st surface) is ∞

|  | wide-angle end | intermediate | telephoto end |
|---|---|---|---|
| f (mm) | 5.00377 | 8.70107 | 14.59713 |
| Fno. | 3.3980 | 3.3833 | 4.0274 |
| $D_0$ | ∞ | ∞ | ∞ |
| $D_5$ | 12.23432 | 6.53666 | 0.79774 |
| $D_8$ | 1.09796 | 6.81905 | 12.53476 |
| $D_{11}$ | 2.66550 | 4.99975 | 11.32016 |
| $D_{14}$ | 4.38756 | 5.61570 | 1.29940 |
| $D_{17}$ | 2.25048 | 1.57990 | 1.18769 |
| $D_{21}$ | 0.99910 | 0.99921 | 0.99933 | where $D_0$ (distance from the object to the 1st surface) is near (17 cm)

|  | wide-angle end | intermediate | telephoto end |
|---|---|---|---|
| $D_0$ | 169.87952 | 169.87952 | 169.87952 |
| $D_5$ | 12.23432 | 6.53666 | 0.79774 |
| $D_8$ | 1.09796 | 6.81905 | 12.53476 |
| $D_{11}$ | 1.47619 | 0.90536 | 5.62716 |
| $D_{14}$ | 4.23413 | 5.14315 | 0.00868 |
| $D_{17}$ | 2.40392 | 2.05245 | 2.47841 |
| $D_{21}$ | 0.99910 | 0.99921 | 0.99933 |

Third Embodiment

Figure 17:
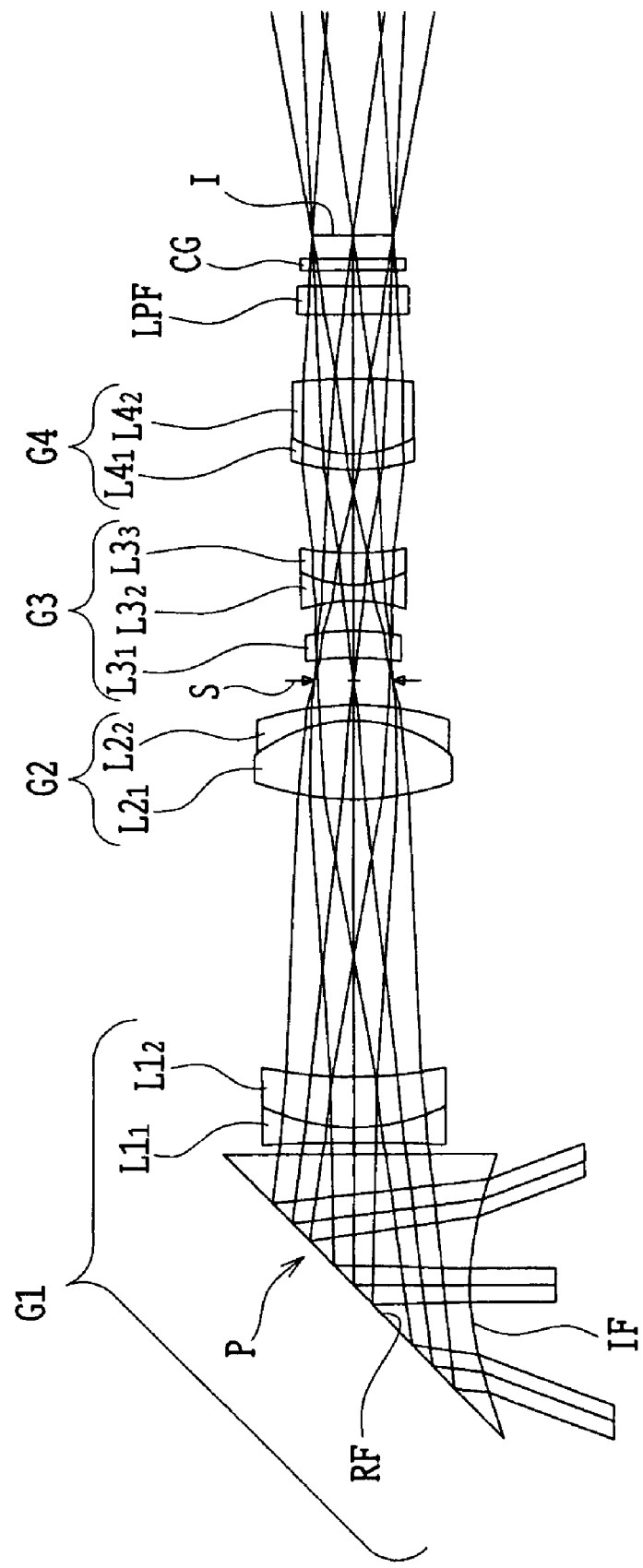
FIG. 17 is a sectional view taken along the optical axis to show the optical configuration in the third embodiment of the zoom lens according to the present invention. It illustrates the state where an object point at an infinite distance is in focus at the wide-angle end with the path of rays being folded.
Figure 18A:
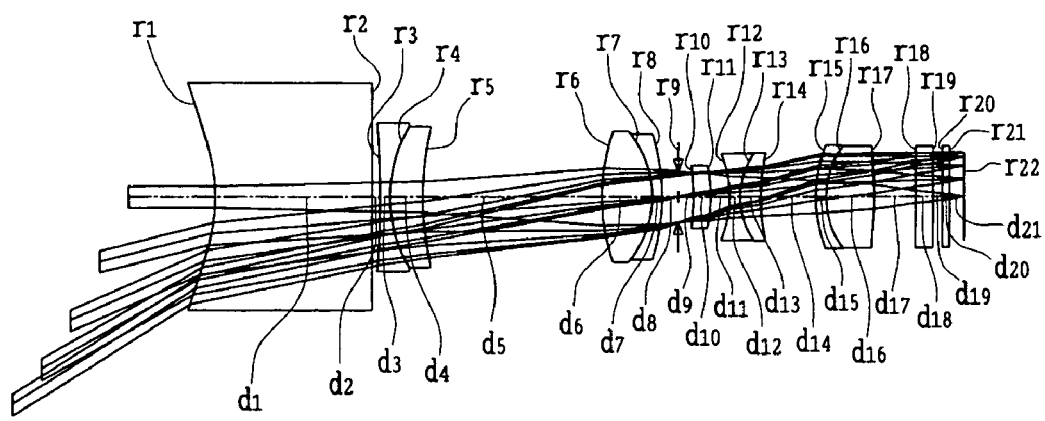
FIGS. 18A, 18B and 18C are sectional views taken along the optical axis to show the optical configuration of the zoom lens according to the third embodiment at the wide-angle end, at the intermediate position, and at the telephoto end, respectively, under the condition where the object point at the infinite distance is in focus.
Figure 18B:
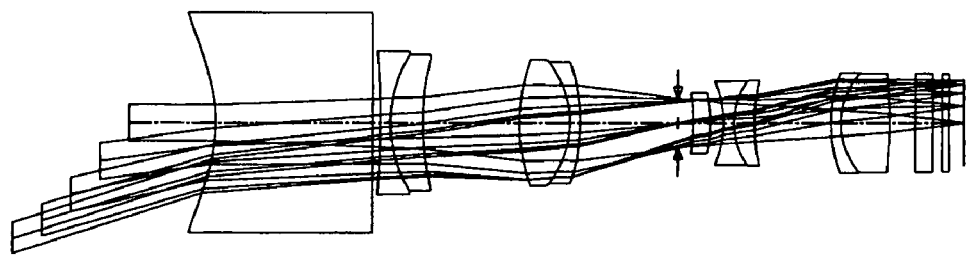
Figure 18C:
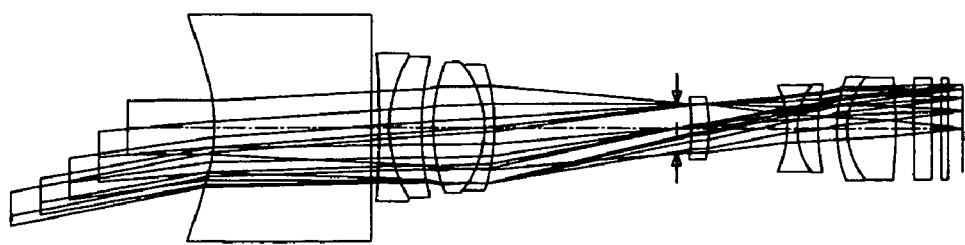

FIG. 17 is a sectional view taken along the optical axis to show the optical configuration in the third embodiment of the zoom lens according to the present invention. It illustrates the state where an object point at an infinite distance is in focus at the wide-angle end with the path of rays being folded. FIG. 18A–18C are sectional views taken along the optical axis to show the optical configuration of the zoom lens according to the third embodiment under the condition where the object point at an infinite distance is in focus. FIG. 18A, FIG. 18B, and FIG. 18C show the states at the wide-angle end, at the intermediate position, and at the telephoto end, respectively. FIGS. 19 through 21 are diagrams that show spherical aberration, astigmatism, distortion, and chromatic aberration of magnification of the zoom lens according to the third embodiment under the condition where the object point at an infinite distance is in focus. FIG. 19, FIG. 20 and FIG. 21 show performance at the wide-angle end, at the intermediate position, and at the telephoto end, respectively. FIGS. 22 through 24 are diagrams that show spherical aberration, astigmatism, distortion, and chromatic aberration of magnification of the zoom lens according to the third embodiment under the condition where an object point at a near distance is in focus. FIG. 22, FIG. 23 and FIG. 24 show performance at the wide-angle end, at the intermediate position, and at the telephoto end, respectively.

In FIG. 17, the reference symbol I denotes an image pickup surface of a CCD, which is an electronic image pickup element, the reference symbol CG denotes a CCD cover glass shaped as a plane parallel plate, and the reference symbol LPF denotes an optical lowpass filter. A zoom lens according to the present invention, the optical lowpass filter LPF, the cover glass CG, and the image pickup surface I are arranged in this order from the object side.

The zoom lens of the third embodiment has, in order from the object side, a first lens unit G1, a second lens unit G2, an aperture stop S, a third lens unit G3, and a fourth lens unit G4.

The first lens unit G1 is composed of, in order from the object side, a prism P having a reflecting surface RF to bend the path of rays toward the object side and a ray-entering surface IF having an aspherical surface that is concave toward the object side and that exerts a weaker power for divergence at a position thereon father from an optical axis, and a rear-side subunit having a negative refractive power, and has a negative refractive power in its entirety.

The rear-side subunit is composed of, in order from the object side, a biconcave negative lens $L1_1$, and a positive meniscus lens $L1_2$ cemented to the biconcave negative lens $L1_1$ and directing the convex surface thereof toward the object side.

The prism P is configured as a reflecting prism to bend the path of rays by 90 deg.

The second lens unit G2 is composed of a cemented lens having, in order from the object side, a biconvex positive lens $L2_1$ and a negative meniscus lens $L2_2$, and has a positive refractive power in its entirety.

The third lens unit G3 is composed of, in order from the object side, a positive meniscus lens $L3_1$, and a cemented lens having a biconcave negative lens $L3_2$ and a positive meniscus lens $L3_3$.

The fourth lens unit G4 is composed of a cemented lens having, in order from the object side, a negative meniscus lens $L4_1$ and a biconvex positive lens $L4_2$.

In a magnification change from the wide-angle end to the telephoto end under the condition where the object point at the infinite distance is in focus, positions of the first lens unit G1, the aperture stop S, and the most object-side lens $L3_1$ of the third lens unit G3 are fixed, the second lens unit G2 shifts only toward the object side, and the cemented lens of the third lens unit G3 shifts only toward the image side.

In a focusing operation, the fourth lens unit G4 shifts along the optical axis.

Beside the ray-entering surface IF of the prism P in the first lens unit G1, each of the object-side surface of the biconcave lens $L_1$ in the first lens unit G1, the object-side surface of the biconvex lens $L2_1$ in the second lens unit G2, and the image-side surface of the biconvex positive lens $L4_2$ in the fourth lens unit G4 is provided with an aspherical surface.

Numerical data of the optical members constituting the zoom lens according to the third embodiment are shown below.

Numerical data 3

$r_1 = -11.2867$ (aspherical)
$d_1 = 10.8000$  $n_{d1} = 1.52540$  $v_{d1} = 56.25$
$r_2 = ∞$
$d_2 = 0.5000$
$r_3 = -138.3425$ (aspherical)
$d_3 = 0.7000$  $n_{d3} = 1.74320$  $v_{d3} = 49.34$
$r_4 = 9.3244$
$d_4 = 2.2000$  $n_{d4} = 1.84666$  $v_{d4} = 23.78$
$r_5 = 19.9906$
$d_5 = D_5$
$r_6 = 12.2440$ (aspherical)
$d_6 = 3.4909$  $n_{d6} = 1.69350$  $v_{d6} = 53.21$ -continued $r_7 = -6.8764$
$d_7 = 0.7000$   $n_{d7} = 1.84666$   $v_{d7} = 23.78$
$r_8 = -13.6579$
$d_8 = D_8$
$r_9 = \infty$ (stop)
$d_9 = 1.0000$
$r_{10} = -15.8713$
$d_{10} = 1.2000$   $n_{d10} = 1.69350$   $v_{d10} = 53.21$
$r_{11} = -10.2172$
$d_{11} = D_{11}$
$r_{12} = -7.4432$
$d_{12} = 0.7000$   $n_{d12} = 1.51742$   $v_{d12} = 52.43$
$r_{13} = 5.0239$
$d_{13} = 1.4000$   $n_{d13} = 1.77250$   $v_{d13} = 49.60$
$r_{14} = 13.7792$
$d_{14} = D_{14}$
$r_{15} = 9.7921$
$d_{15} = 0.7000$   $n_{d15} = 1.84666$   $v_{d15} = 23.78$
$r_{16} = 5.5694$
$d_{16} = 3.3000$   $n_{d16} = 1.69350$   $v_{d16} = 53.21$
$r_{17} = -18.3733$ (aspherical)
$d_{17} = D_{17}$
$r_{18} = \infty$
$d_{18} = 1.2231$   $n_{d18} = 1.54771$   $v_{d18} = 62.84$
$r_{19} = \infty$
$d_{19} = 0.6795$
$r_{20} = \infty$
$d_{20} = 0.5096$   $n_{d20} = 1.51633$   $v_{d20} = 64.14$
$r_{21} = \infty$
$d_{21} = D_{21}$
$r_{22} = \infty$ (image pickup surface)

Aspherical coefficients

1st surface $K = 0$
$A_2 = 0$   $A_4 = 3.7457 \times 10^{-4}$   $A_6 = -1.2302 \times 10^{-6}$
$A_8 = 7.3582 \times 10^{-9}$   $A_{10} = 0$ 3rd surface $K = 0$
$A_2 = 0$   $A_4 = -1.3553 \times 10^{-4}$   $A_6 = -3.6036 \times 10^{-7}$
$A_8 = 2.4619 \times 10^{-9}$   $A_{10} = 0$ 6th surface $K = 0$
$A_2 = 0$   $A_4 = -1.4252 \times 10^{-4}$   $A_6 = -1.7992 \times 10^{-7}$
$A_8 = 2.8885 \times 10^{-8}$   $A_{10} = 0$ 17th surface $K = 0$
$A_2 = 0$   $A_4 = 9.1963 \times 10^{-4}$   $A_6 = 9.8963 \times 10^{-6}$
$A_8 = 1.0206 \times 10^{-6}$   $A_{10} = 0$ Zoom Data where $D_0$ (distance from the object to the 1st surface) is $\infty$

|  | wide-angle end | intermediate | telephoto end |
|---|---|---|---|
| f (mm) | 5.00395 | 8.70265 | 14.59710 |
| Fno. | 3.4232 | 3.4242 | 3.9857 |
| $D_0$ | $\infty$ | $\infty$ | $\infty$ |
| $D_5$ | 12.3182 | 6.61904 | 0.79834 |
| $D_8$ | 1.09847 | 6.80291 | 12.61844 |
| $D_{11}$ | 1.31360 | 0.90201 | 5.31957 |
| $D_{14}$ | 3.68833 | 5.19173 | 1.29887 |
| $D_{17}$ | 2.81370 | 1.71467 | 1.19720 |
| $D_{21}$ | 0.99944 | 0.99909 | 0.99924 |

48 where $D_0$ (distance from the object to the 1st surface) is near (17 cm)

|  | wide-angle end | intermediate | telephoto end |
|---|---|---|---|
| $D_0$ | 169.87952 | 169.87952 | 169.87952 |
| $D_5$ | 12.31824 | 6.61904 | 0.79834 |
| $D_8$ | 1.09847 | 6.80291 | 12.61844 |
| $D_{11}$ | 1.31360 | 0.90201 | 5.31957 |
| $D_{14}$ | 3.53290 | 4.69568 | -0.06932 |
| $D_{17}$ | 2.96913 | 2.21073 | 2.56540 |
| $D_{21}$ | 0.99944 | 0.99909 | 0.99924 |

Fourth Embodiment

Figure 25:
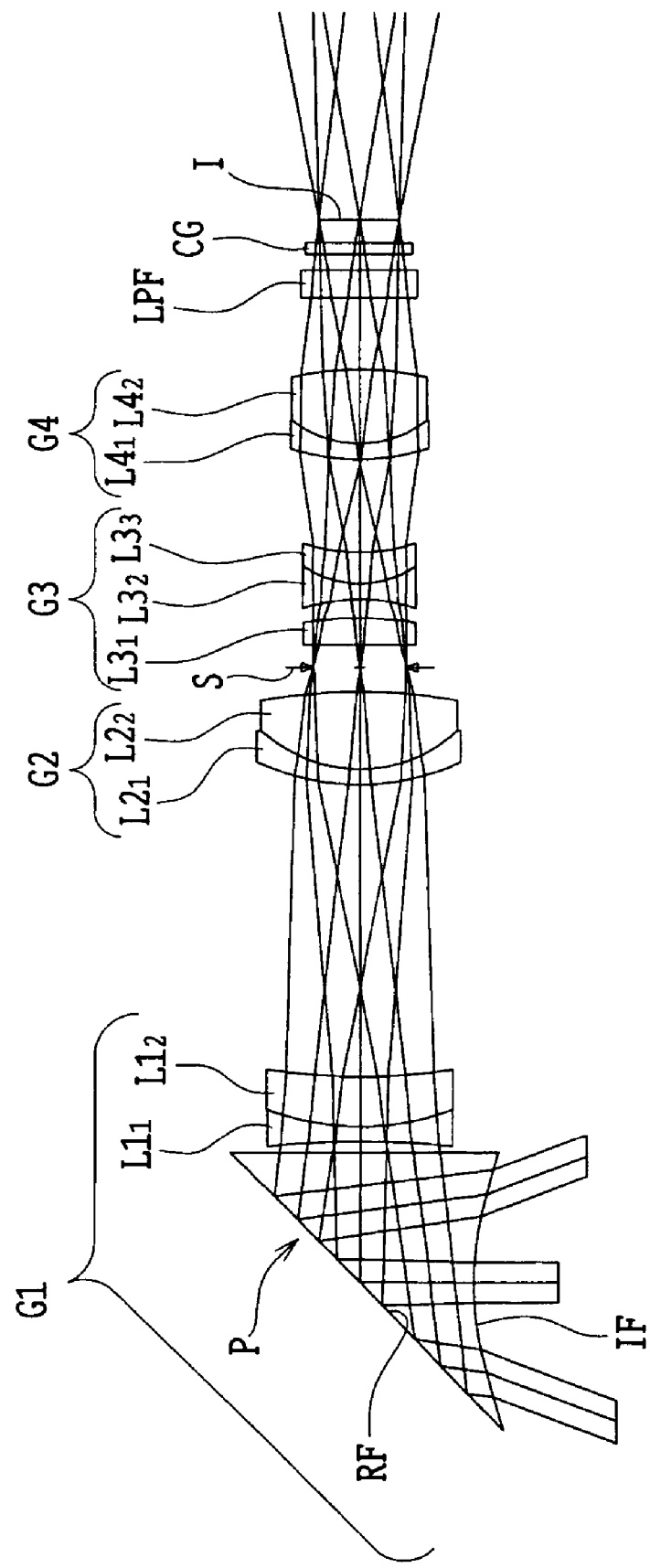
FIG. 25 is a sectional view taken along the optical axis to show the optical configuration in the fourth embodiment of the zoom lens according to the present invention. It illustrates the state where an object point at an infinite distance is in focus at the wide-angle end with the path of rays being folded.
Figure 26A:
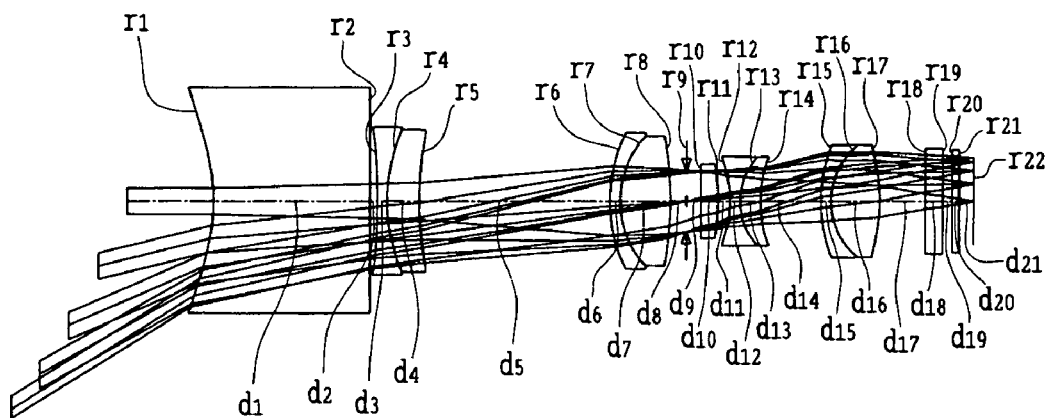
FIGS. 26A, 26B and 26C are sectional views taken along the optical axis to show the optical configuration of the zoom lens according to the fourth embodiment at the wide-angle end, at the intermediate position, and at the telephoto end, respectively, under the condition where the object point at the infinite distance is in focus.
Figure 26B:
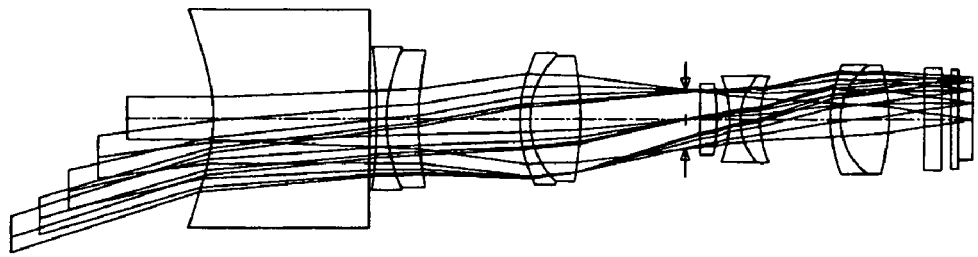
Figure 26C:
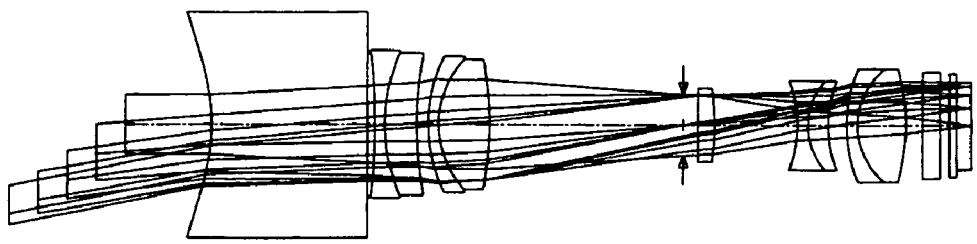
Figures 30A, 30B, 30C, 30D:
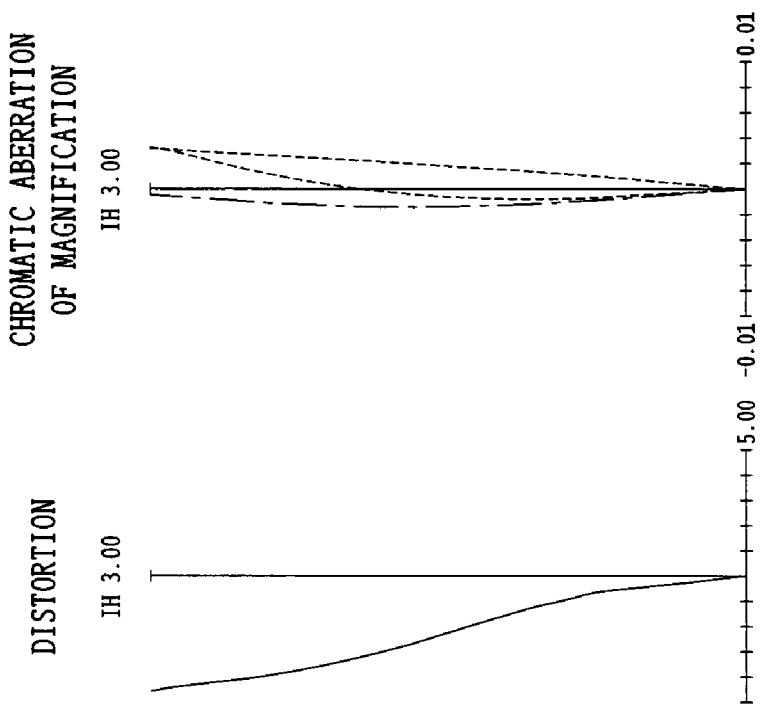
FIGS. 30A, 30B, 30C and 30D are diagrams to show spherical aberration, astigmatism, distortion and chromatic aberration of magnification, respectively, of the zoom lens according to the fourth embodiment at the wide-angle end under the condition where an object point at a near distance is in focus.
Figures 31A, 31B, 31C, 31D:
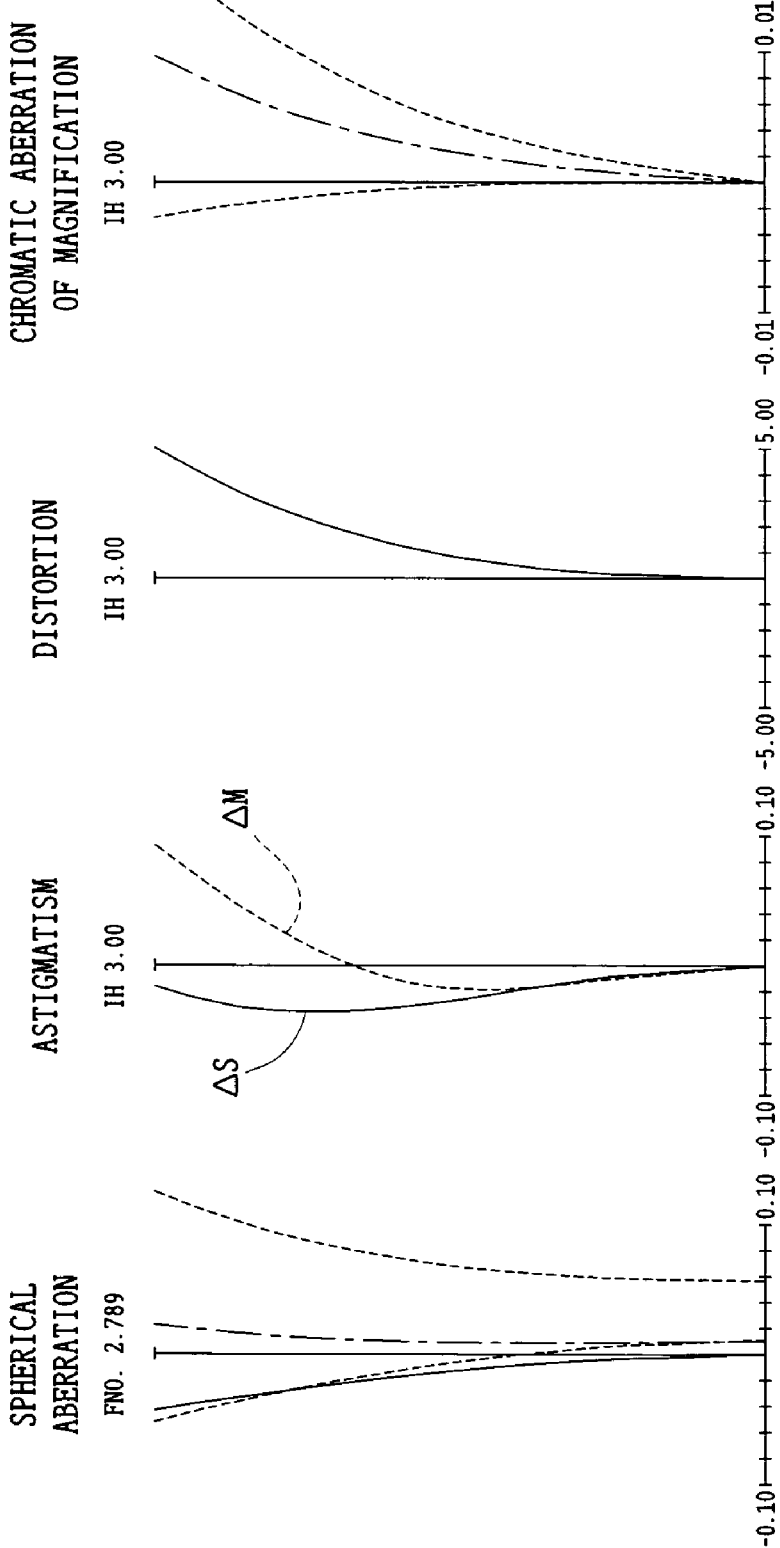
FIGS. 31A, 31B, 31C and 31D are diagrams to show spherical aberration, astigmatism, distortion and chromatic aberration of magnification, respectively, of the zoom lens according to the fourth embodiment at the intermediate position under the condition where the object point at the near distance is in focus.

FIG. 25 is a sectional view taken along the optical axis to show the optical configuration in the fourth embodiment of the zoom lens according to the present invention. It illustrates the state where an object point at an infinite distance is in focus at the wide-angle end with the path of rays being folded. FIG. 26A–26C are sectional views taken along the optical axis to show the optical configuration of the zoom lens according to the fourth embodiment under the condition where the object point at an infinite distance is in focus. FIG. 26A, FIG. 26B, and FIG. 26C show the states at the wide-angle end, at the intermediate position, and at the telephoto end, respectively. FIGS. 27 through 29 are diagrams that show spherical aberration, astigmatism, distortion, and chromatic aberration of magnification of the zoom lens according to the fourth embodiment under the condition where the object point at an infinite distance is in focus. FIG. 27, FIG. 28 and FIG. 29 show performance at the wide-angle end, at the intermediate position, and at the telephoto end, respectively. FIGS. 30 through 32 are diagrams that show spherical aberration, astigmatism, distortion, and chromatic aberration of magnification of the zoom lens according to the fourth embodiment under the condition where an object point at a near distance is in focus. FIG. 30, FIG. 31 and FIG. 32 show performance at the wide-angle end, at the intermediate position, and at the telephoto end, respectively.

In FIG. 25, the reference symbol I denotes an image pickup surface of a CCD, which is an electronic image pickup element, the reference symbol CG denotes a CCD cover glass shaped as a plane parallel plate, and the reference symbol LPF denotes an optical lowpass filter. A zoom lens according to the present invention, the optical lowpass filter LPF, the cover glass CG, and the image pickup surface I are arranged in this order from the object side.

The zoom lens of the fourth embodiment has, in order from the object side, a first lens unit G1, a second lens unit G2, an aperture stop S, a third lens unit G3, and a fourth lens unit G4.

The first lens unit G1 is composed of, in order from the object side, a prism P having a reflecting surface RF to bend the path of rays toward the object side and a ray-entering surface IF having an aspherical surface that is concave toward the object side and that exerts a weaker power for divergence at a position thereon father from an optical axis, and a rear-side subunit having a negative refractive power, and has a negative refractive power in its entirety.

The rear-side subunit is composed of, in order from the object side, a biconcave negative lens $L1_1$, and a positive meniscus lens $L1_2$ cemented to the biconcave negative lens $L1_1$ and directing the convex surface thereof toward the object side.

The prism P is configured as a reflecting prism to bend the path of rays by 90 deg.

The second lens unit G2 is composed of a cemented lens having, in order from the object side, a negative meniscus lens $L2_1$ and a biconvex positive lens $L2_2$, and has a positive refractive power in its entirety.

The third lens unit G3 is composed of, in order from the object side, a biconvex positive lens $L3_1$, and a cemented lens having a biconcave negative lens $L3_2$ and a positive meniscus lens $L3_3$. The fourth lens unit G4 is composed of a cemented lens having, in order from the object side, a negative meniscus lens $L4_1$ and a biconvex positive lens $L4_2$.

In a magnification change from the wide-angle end to the telephoto end under the condition where the object point at the infinite distance is in focus, positions of the first lens unit G1, the aperture stop S, and the most object-side lens $L3_1$ of the third lens unit G3 are fixed, the second lens unit G2 shifts only toward the object side, and the cemented lens of the third lens unit G3 shifts only toward the image side.

In a focusing operation, the fourth lens unit G4 shifts along the optical axis.

Beside the ray-entering surface IF of the prism P in the first lens unit G1, each of the object-side surface of the biconcave lens $L1_1$ in the first lens unit G1, the image-side surface of the biconvex lens $L2_2$ in the second lens unit G2, and the image-side surface of the biconvex positive lens $L4_2$ in the fourth lens unit G4 is provided with an aspherical surface.

Numerical data of the optical members constituting the zoom lens according to the fourth embodiment are shown below.

| Numerical data 4 | | | |
|---|---|---|---|
| $r_1 = -12.4196$ (aspherical) | | | |
| $d_1 = 10.8000$ | | $n_{d1} = 1.52540$ | $v_{d1} = 56.25$ |
| $r_2 = \infty$ | | | |
| $d_2 = 0.5000$ | | | |
| $r_3 = -53.5376$ (aspherical) | | | |
| $d_3 = 0.7000$ | | $n_{d3} = 1.74320$ | $v_{d3} = 49.34$ |
| $r_4 = 12.0098$ | | | |
| $d_4 = 2.2000$ | | $n_{d4} = 1.84666$ | $v_{d4} = 23.78$ |
| $r_5 = 26.2963$ | | | |
| $d_5 = D_5$ | | | |
| $r_6 = 10.6250$ | | | |
| $d_6 = 0.7000$ | | $n_{d6} = 1.69350$ | $v_{d6} = 53.21$ |
| $r_7 = 6.4196$ | | | |
| $d_7 = 3.5000$ | | $n_{d7} = 1.69350$ | $v_{d7} = 53.21$ |
| $r_8 = -21.9943$ (aspherical) | | | |
| $d_8 = D_8$ | | | |
| $r_9 = \infty$ (stop) | | | |
| $d_9 = 1.0000$ | | | |
| $r_{10} = 278.6958$ | | | |
| $d_{10} = 1.2000$ | | $n_{d10} = 1.69350$ | $v_{d10} = 53.21$ |
| $r_{11} = -17.2478$ | | | |
| $d_{11} = D_{11}$ | | | |
| $r_{12} = -8.3462$ | | | |
| $d_{12} = 0.7000$ | | $n_{d12} = 1.51742$ | $v_{d12} = 52.43$ |
| $r_{13} = 4.4638$ | | | |
| $d_{13} = 1.4000$ | | $n_{d13} = 1.77250$ | $v_{d13} = 49.60$ |
| $r_{14} = 8.1503$ | | | |
| $d_{14} = D_{14}$ | | | |
| $r_{15} = 10.3017$ | | | |
| $d_{15} = 0.7000$ | | $n_{d15} = 1.84666$ | $v_{d15} = 23.78$ |
| $r_{16} = 4.9503$ | | | |
| $d_{16} = 3.3000$ | | $n_{d16} = 1.69350$ | $v_{d16} = 53.21$ |
| $r_{17} = -11.5715$ (aspherical) | | | |
| $d_{17} = D_{17}$ | | | |
| $r_{18} = \infty$ | | | |
| $d_{18} = 1.2231$ | | $n_{d18} = 1.54771$ | $v_{d18} = 62.84$ |
| $r_{19} = \infty$ | | | |
| $d_{19} = 0.6795$ | | | |
| $r_{20} = \infty$ | | | |
| $d_{20} = 0.5096$ | | $n_{d20} = 1.51633$ | $v_{d20} = 64.14$ |
| $r_{21} = \infty$ | | | |
| $d_{21} = D_{21}$ | | | |
| $r_{22} = \infty$ (image pickup surface) | | | |

-continued

| Aspherical coefficients | | |
|---|---|---|
| 1st surface | | |
| $K = 0$ | | |
| $A_2 = 0$ | $A_4 = 2.9416 \times 10^{-4}$ | $A_6 = -2.4169 \times 10^{-7}$ |
| $A_8 = -2.4184 \times 10^{-9}$ | $A_{10} = 0$ | |
| 3rd surface | | |
| $K = 0$ | | |
| $A_2 = 0$ | $A_4 = -1.3553 \times 10^{-4}$ | $A_6 = -3.6036 \times 10^{-7}$ |
| $A_8 = 2.4619 \times 10^{-9}$ | $A_{10} = 0$ | |
| 8th surface | | |
| $K = 0$ | | |
| $A_2 = 0$ | $A_4 = 1.3787 \times 10^{-4}$ | $A_6 = 8.0659 \times 10^{-8}$ |
| $A_8 = -2.1200 \times 10^{-8}$ | $A_{10} = 0$ | |
| 17th surface | | |
| $K = 0$ | | |
| $A_2 = 0$ | $A_4 = 5.4518 \times 10^{-4}$ | $A_6 = 1.6855 \times 10^{-5}$ |
| $A_8 = 14.9004 \times 10^{-7}$ | $A_{10} = 0$ | |

Zoom Data where $D_0$ (distance from the object to the 1st surface) is $\infty$

| | wide-angle end | intermediate | telephoto end |
|---|---|---|---|
| f (mm) | 5.01799 | 8.69719 | 14.59082 |
| Fno. | 2.8429 | 2.8421 | 3.3170 |
| $D_0$ | $\infty$ | $\infty$ | $\infty$ |
| $D_5$ | 13.12618 | 6.93744 | 0.79483 |
| $D_8$ | 1.08989 | 7.28021 | 13.42125 |
| $D_{11}$ | 0.83855 | 0.90468 | 5.73298 |
| $D_{14}$ | 4.17422 | 4.85365 | 1.29700 |
| $D_{17}$ | 3.16399 | 2.41615 | 1.14740 |
| $D_{21}$ | 0.99819 | 0.99862 | 0.99756 | where $D_0$ (distance from the object to the 1st surface) is near (17 cm)

| | wide-angle end | intermediate | telephoto end |
|---|---|---|---|
| $D_0$ | 169.87952 | 169.87952 | 169.87952 |
| $D_5$ | 13.12618 | 6.93744 | 0.79483 |
| $D_8$ | 1.08989 | 7.28021 | 13.42125 |
| $D_{11}$ | 0.83855 | 0.90468 | 5.73298 |
| $D_{14}$ | 4.02668 | 4.40247 | -0.01751 |
| $D_{17}$ | 3.31153 | 2.86734 | 2.46191 |
| $D_{21}$ | 0.99819 | 0.99862 | 0.99756 |

Fifth Embodiment

Figure 33:
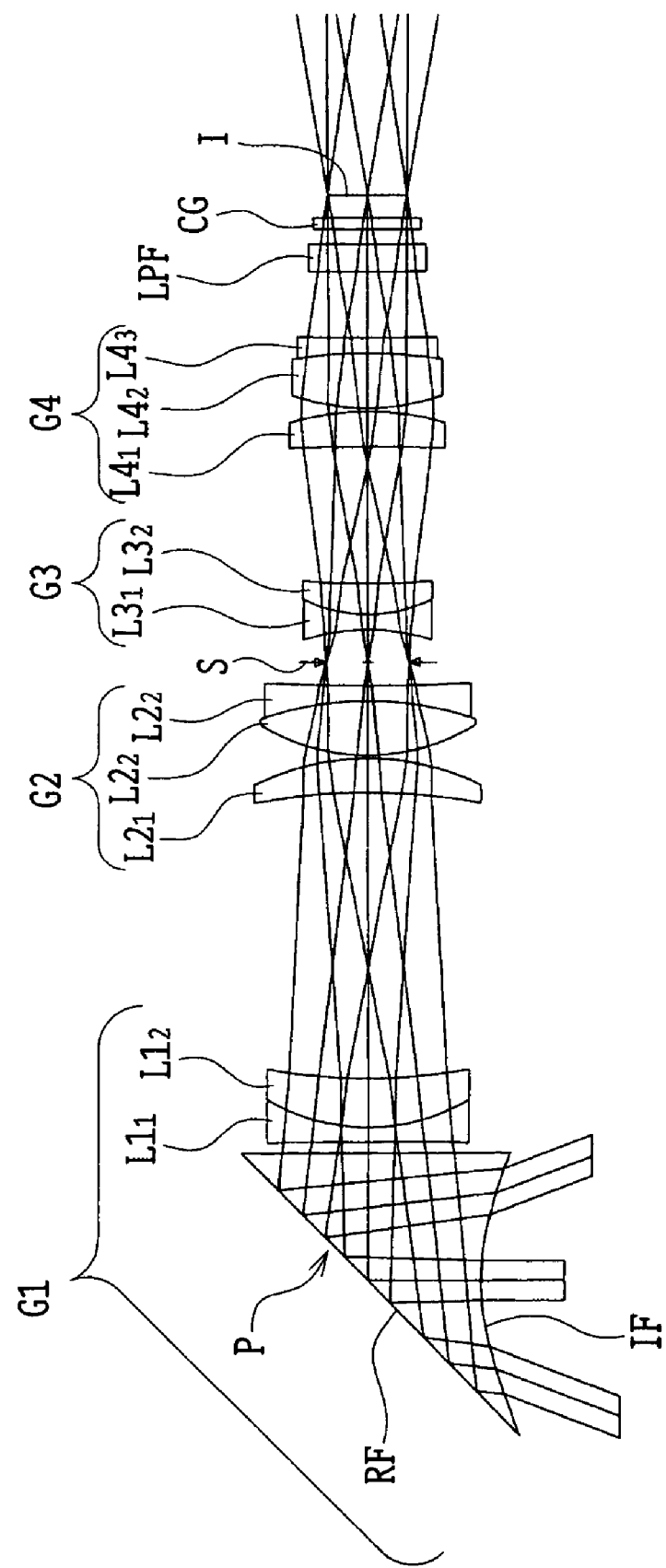
FIG. 33 is a sectional view taken along the optical axis to show the optical configuration in the fifth embodiment of the zoom lens according to the present invention. It illustrates the state where an object point at an infinite distance is in focus at the wide-angle end with the path of rays being folded.
Figure 34A:
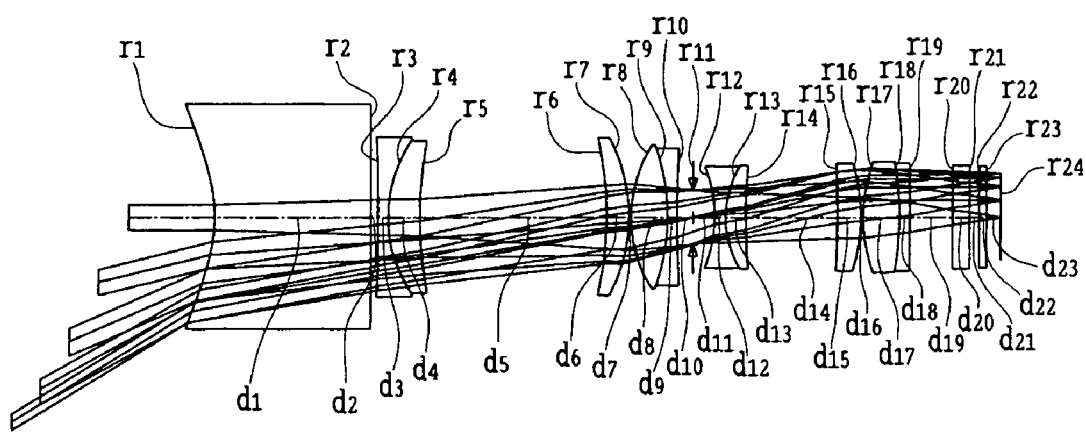
FIGS. 34A, 34B and 34C are sectional views taken along the optical axis to show the optical configuration of the zoom lens according to the fifth embodiment at the wide-angle end, at the intermediate position, and at the telephoto end, respectively, under the condition where the object point at the infinite distance is in focus.
Figure 34B:
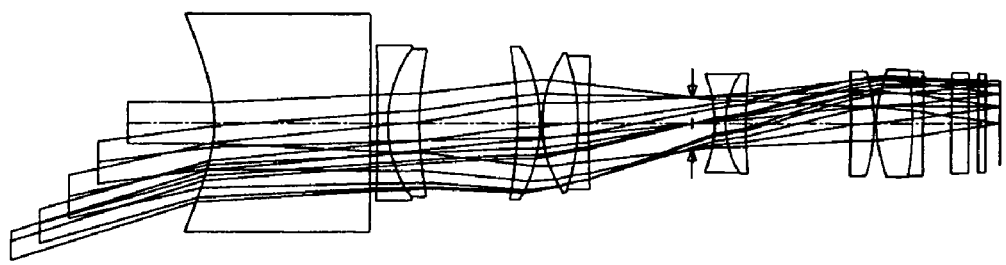
Figure 34C:
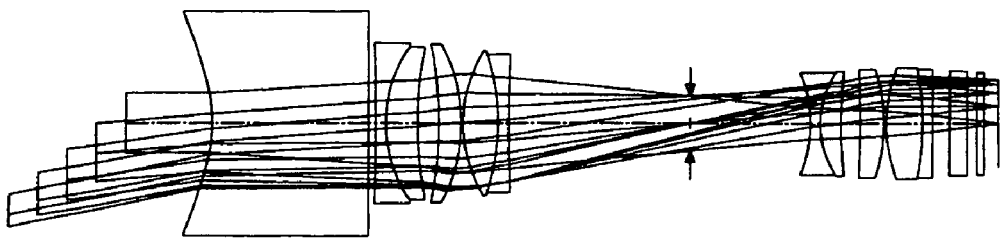
Figures 38A, 38B, 38C, 38D:
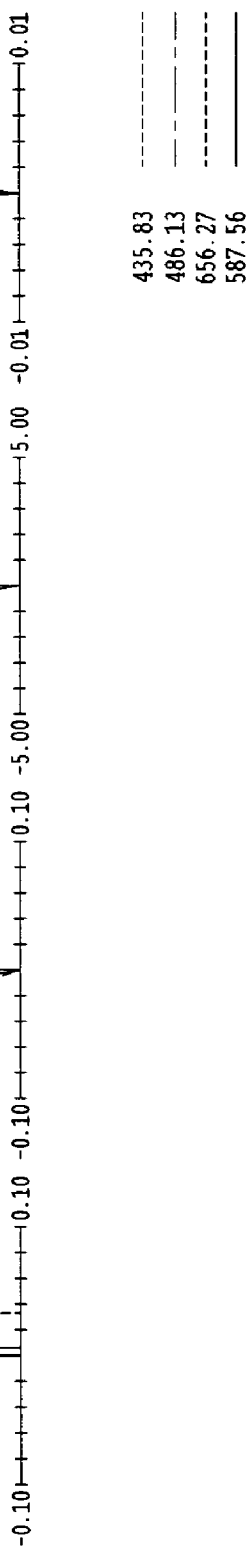
FIGS. 38A, 38B, 38C and 38D are diagrams to show spherical aberration, astigmatism, distortion and chromatic aberration of magnification, respectively, of the zoom lens according to the fifth embodiment at the wide-angle end under the condition where an object point at a near distance is in focus.

FIG. 33 is a sectional view taken along the optical axis to show the optical configuration in the fifth embodiment of the zoom lens according to the present invention. It illustrates the state where an object point at an infinite distance is in focus at the wide-angle end with the path of rays being folded. FIG. 34A–34C are sectional views taken along the optical axis to show the optical configuration of the zoom lens according to the fifth embodiment under the condition where the object point at an infinite distance is in focus. FIG. 34A, FIG. 34B, and FIG. 34C show the states at the wide-angle end, at the intermediate position, and at the telephoto end, respectively. FIGS. 35 through 37 are diagrams that show spherical aberration, astigmatism, distortion, and chromatic aberration of magnification of the zoom lens according to the fifth embodiment under the condition where the object point at an infinite distance is in focus. FIG. 35, FIG. 36 and FIG. 37 show performance at the wide-angle end, at the intermediate position, and at the telephoto end, respectively. FIGS. 38 through 40 are diagrams that show spherical aberration, astigmatism, distortion, and chromatic aberration of magnification of the zoom lens according to the fifth embodiment under the condition where an object point at a near distance is in focus. FIG. 38, FIG. 39 and FIG. 40 show performance at the wide-angle end, at the intermediate position, and at the telephoto end, respectively.

In FIG. 33, the reference symbol I denotes an image pickup surface of a CCD, which is an electronic image pickup element, the reference symbol CG denotes a CCD cover glass shaped as a plane parallel plate, and the reference symbol LPF denotes an optical lowpass filter. A zoom lens according to the present invention, the optical lowpass filter LPF, the cover glass CG, and the image pickup surface I are arranged in this order from the object side.

The zoom lens of the fifth embodiment has, in order from the object side, a first lens unit G1, a second lens unit G2, an aperture stop S, a third lens unit G3, and a fourth lens unit G4.

The first lens unit G1 is composed of, in order from the object side, a prism P having a reflecting surface RF to bend the path of rays toward the object side and a ray-entering surface IF having an aspherical surface that is concave toward the object side and that exerts a weaker power for divergence at a position thereon father from an optical axis, and a rear-side subunit having a negative refractive power, and has a negative refractive power in its entirety.

The rear-side subunit is composed of, in order from the object side, a biconcave negative lens $L1_1$, and a positive meniscus lens $L1_2$ cemented to the biconcave negative lens $L1_1$ and directing the convex surface thereof toward the object side.

The prism P is configured as a reflecting prism to bend the path of rays by 90 deg.

The second lens unit G2 is composed of, in order from the object side, a positive meniscus lens $L2_1$, and a cemented lens having a biconvex positive lens $L2_2$ and a biconcave negative lens $L1_3$, and has a negative refractive power in its entirety.

The third lens unit G3 is composed of a cemented lens having, in order from the object side, a biconcave negative lens $L3_1$ and a positive meniscus lens $L3_2$.

The fourth lens unit G4 is composed of, in order from the object side, a positive meniscus lens $L4_1$, and a cemented lens having a biconvex positive lens $L4_2$ and a biconcave negative lens $L4_3$.

In a magnification change from the wide-angle end to the telephoto end under the condition where the object point at the infinite distance is in focus, positions of the first lens unit G1 and the aperture stop S are fixed, the second lens unit G2 shifts only toward the object side, and the third lens unit G3 shifts only toward the image side.

In a focusing operation, the fourth lens unit G4 shifts along the optical axis.

Beside the ray-entering surface IF of the prism P in the first lens unit G1, each of the object-side surface of the biconcave lens $L1_1$ in the first lens unit G1, the object-side surface of the biconvex lens $L2_2$ in the second lens unit G2, and the object-side surface of the biconvex positive lens $L4_1$ in the fourth lens unit G4 is provided with an aspherical surface.

Numerical data of the optical members constituting the zoom lens according to the fifth embodiment are shown below.

| Numerical data 5 | | |
|---|---|---|
| $r_1 = -10.5132$ (aspherical) | | |
| $d_1 = 10.8000$ | $n_{d1} = 1.52540$ | $v_{d1} = 56.25$ |
| $r_2 = \infty$ | | |
| $d_2 = 0.5000$ | | |
| $r_3 = 534.1460$ (aspherical) | | |
| $d_3 = 0.7000$ | $n_{d3} = 1.74320$ | $v_{d3} = 49.34$ |
| $r_4 = 9.0000$ | | |
| $d_4 = 2.2000$ | $n_{d4} = 1.84666$ | $v_{d4} = 23.78$ |
| $r_5 = 25.4736$ | | |
| $d_5 = D_5$ | | |
| $r_6 = -26.2943$ | | |
| $d_6 = 1.5631$ | $n_{d6} = 1.72916$ | $v_{d6} = 54.68$ |
| $r_7 = -11.3423$ | | |
| $d_7 = 0.1500$ | | |
| $r_8 = 9.2254$ (aspherical) | | |
| $d_8 = 2.4901$ | $n_{d8} = 1.58313$ | $v_{d8} = 59.38$ |
| $r_9 = -14.7020$ | | |
| $d_9 = 0.7000$ | $n_{d9} = 1.84666$ | $v_{d9} = 23.78$ |
| $r_{10} = 83.9613$ | | |
| $d_{10} = D_{10}$ | | |
| $r_{11} = \infty$ (stop) | | |
| $d_{11} = D_{11}$ | | |
| $r_{12} = -9.2160$ | | |
| $d_{12} = 0.7000$ | $n_{d12} = 1.51742$ | $v_{d12} = 52.43$ |
| $r_{13} = 6.5013$ | | |
| $d_{13} = 1.4000$ | $n_{d13} = 1.77250$ | $v_{d13} = 49.60$ |
| $r_{14} = 33.6122$ | | |
| $d_{14} = D_{14}$ | | |
| $r_{15} = -79.6503$ | | |
| $d_{15} = 1.5971$ | $n_{d15} = 1.72916$ | $v_{d15} = 54.68$ |
| $r_{16} = -12.6716$ | | |
| $d_{16} = 0.1500$ | | |
| $r_{17} = 9.6450$ (aspherical) | | |
| $d_{17} = 2.4915$ | $n_{d17} = 1.58313$ | $v_{d17} = 59.38$ |
| $r_{18} = -21.2876$ | | |
| $d_{18} = 0.7000$ | $n_{d18} = 1.84666$ | $v_{d18} = 23.78$ |
| $r_{19} = 2346.3639$ | | |
| $d_{19} = D_{19}$ | | |
| $r_{20} = \infty$ | | |
| $d_{20} = 1.2231$ | $n_{d20} = 1.54771$ | $v_{d20} = 62.84$ |
| $r_{21} = \infty$ | | |
| $d_{21} = 0.6795$ | | |
| $r_{22} = \infty$ | | |
| $d_{22} = 0.5096$ | $n_{d22} = 1.51633$ | $v_{d22} = 64.14$ |
| $r_{23} = \infty$ | | |
| $d_{23} = 0.9988$ | | |
| $r_{24} = \infty$ (image pickup surface) | | |

| Aspherical coefficients | | |
|---|---|---|
| 1st surface | | |
| $K = 0$ | | |
| $A_2 = 0$ | $A_4 = 3.7982 \times 10^{-4}$ | $A_6 = -4.3853 \times 10^{-7}$ |
| $A_8 = 5.6902 \times 10^{-9}$ | $A_{10} = 0$ | |
| 3rd surface | | |
| $K = 0$ | | |
| $A_2 = 0$ | $A_4 = -1.3553 \times 10^{-4}$ | $A_6 = -3.6036 \times 10^{-7}$ |
| $A_8 = 2.4619 \times 10^{-9}$ | $A_{10} = 0$ | |
| 8th surface | | |
| $K = 0$ | | |
| $A_2 = 0$ | $A_4 = -2.3232 \times 10^{-6}$ | $A_6 = 7.9862 \times 10^{-8}$ |
| $A_8 = 2.5004 \times 10^{-8}$ | $A_{10} = 0$ | |
| 17th surface | | |
| $K = 0$ | | |
| $A_2 = 0$ | $A_4 = -8.2740 \times 10^{-5}$ | $A_6 = -2.7423 \times 10^{-5}$ |
| $A_8 = 9.8465 \times 10^{-8}$ | $A_{10} = 0$ | |

Zoom Data where $D_0$ (distance from the object to the 1st surface) is ∞

|  | wide-angle end | intermediate | telephoto end |
|---|---|---|---|
| f (mm) | 5.02489 | 8.70228 | 14.59110 |
| Fno. | 2.8637 | 2.9540 | 3.5434 |
| $D_0$ | ∞ | ∞ | ∞ |
| $D_5$ | 13.09065 | 6.92383 | 1.49503 |
| $D_{10}$ | 1.08532 | 7.23276 | 12.68085 |
| $D_{11}$ | 1.49830 | 1.58181 | 8.24855 |
| $D_{14}$ | 6.25187 | 7.19284 | 1.29853 |
| $D_{19}$ | 2.98313 | 1.97062 | 1.18651 |
| $D_{23}$ | 0.99880 | 0.99552 | 0.99868 | where $D_0$ (distance from the object to the 1st surface) is near (17 cm)

|  | wide-angle end | intermediate | telephoto end |
|---|---|---|---|
| $D_0$ | 169.87952 | 169.87952 | 169.87952 |
| $D_5$ | 13.09065 | 6.92383 | 1.49503 |
| $D_{10}$ | 1.08532 | 7.23276 | 12.68085 |
| $D_{11}$ | 1.49830 | 1.58181 | 8.24855 |
| $D_{14}$ | 6.10582 | 6.74430 | 0.05753 |
| $D_{19}$ | 3.12918 | 2.41916 | 2.42751 |
| $D_{23}$ | 0.99880 | 0.99552 | 0.99868 |

In each of the embodiments, the path of rays is folded in the direction of the long side (horizontal direction) of the electronic image pickup element (CCD), as set forth above. Folding the path in the short-side direction (vertical direction) requires a smaller space for it and thus is advantageous in view of compact design. However, a configuration that allows the path of rays to be folded in the direction of the long side is adaptable to path folding in either direction along the long side or the short side, and thus is preferable in that it facilitates design versatility of a camera in which the lens is incorporated.

For each of the above-described embodiments, values of parameters in the conditional expressions and the like are shown as follows.

What is claimed is:

1. A zoom lens comprising:
   a first lens unit having a negative refractive power; and
   an aperture stop disposed on an image side of the first lens unit,
   wherein the first lens unit has, on a most object side, an optical element having a reflecting surface to fold a path of rays, and is fixed in a magnification change,
   wherein a position of the aperture stop is fixed in reference to an image surface in the magnification change, and
   wherein an ray-entering surface of the optical element has an aspherical surface concave toward an object side that exerts a weaker power for divergence at a position thereon father from an optical axis.

2. A zoom lens according to claim 1, comprising a second lens unit having a positive refractive power disposed between the first lens unit and the aperture stop, wherein, in a magnification change from a wide-angle end to a telephoto end under a condition where an object point at an infinite distance is in focus, the second lens unit shifts only in one direction and satisfies the following condition:

$$0.45 < \log\gamma_B/\log\gamma < 0.85$$

where $f_T$ is a focal length of an entire system of the zoom lens at the telephoto end, $f_W$ is a focal length of the entire system of the zoom lens at the wide-angle end, $\gamma = f_T/f_W$, and $\gamma_B$ is a magnification of the lens unit G2 at the telephoto end divided by a magnification of the lens unit G2 at the wide-angle end.

3. A zoom lens according to claim 2, comprising, in order from the aperture stop toward the image side, a third lens unit having a negative refractive power and a fourth lens unit having a positive refractive power, wherein the third lens unit and the fourth lens unit are arranged adjacent to one another, and, in a magnification change from the wide-angle end to the telephoto end under a condition where an object point at an infinite distance is in focus, a distance between the third lens unit and the fourth lens unit is smaller at the telephoto end than at the wide-angle end.

|  | first embodiment | second embodiment | third embodiment | fourth embodiment | fifth embodiment |
|---|---|---|---|---|---|
| lens data | numerical data 1 | numerical data 2 | numerical data 3 | numerical data 4 | numerical data 5 |
| half field angle at wide-angle end | 33.0° | 33.2° | 33.3° | 33.2° | 32.8° |
| half field angle at intermediate | 19.1° | 18.4° | 18.4° | 18.7° | 18.3° |
| half field angle at telephoto end | 11.7° | 11.6° | 11.5° | 11.6° | 11.6° |
| L | 6.0 | 6.0 | 6.0 | 6.0 | 6.0 |
| e/L | 7.080 | 7.080 | 7.080 | 7.080 | 7.080 |
| $n_{pri}$ | 1.52540 | 1.52540 | 1.52540 | 1.52540 | 1.52540 |
| $\log\gamma_B/\log\gamma$ | 0.76255 | 1.13558 | 1.07265 | 1.23194 | 0.87621 |
| $M_3/M_2$ | −0.55129 | −0.36295 | −0.34774 | −0.39691 | −0.58214 |
| $M_4/M_3$ | 0.36596 | 0.25603 | 0.40352 | 0.41202 | 0.26616 |
| $\beta_{Rt}$ | −0.99884 | −1.46760 | −1.44111 | −1.37500 | −1.16320 |
| $f_{11}/f_{12}$ | 0.32932 | 1.28229 | 0.78209 | 0.89342 | 0.39674 |
| $\tau_{600}/\tau_{550}$ | 1.0 | 1.0 | 1.0 | 1.0 | 1.0 |
| $\tau_{700}/\tau_{550}$ | 0.04 | 0.04 | 0.04 | 0.04 | 0.04 |
| $\tau_{400}/\tau_{550}$ | 0.0 | 0.0 | 0.0 | 0.0 | 0.0 |
| $\tau_{440}/\tau_{550}$ | 1.06 | 1.06 | 1.06 | 1.06 | 1.06 |
| a | 3.5 | 2.5 | 2.0 | 3.0 | 2.8 |
| $t_{LPF}$ | 0.42 | 0.30 | 0.24 | 0.36 | 0.34 |

4. A zoom lens according to claim 3, wherein, in the magnification change from the wide-angle end to the telephoto end under the condition where the object point at an infinite distance is in focus, a position of the fourth lens unit is more image-side at the telephoto end than at the wide-angle end.

5. A zoom lens according to claim 1, comprising a lens unit that is disposed on an image side of the aperture stop and that performs focusing.

6. A zoom lens according to claim 1, comprising a lens unit that has a positive refractive power and that has an aspherical surface.

7. A zoom lens according to claim 1, comprising a lens unit that has a positive refractive power and that includes a cemented lens component.

8. A zoom lens according to claim 7, wherein the lens unit consists of the cemented lens component.

9. A zoom lens according to claim 1, satisfying the following condition:

$$0.45 < e/L < 1.2$$

where L is a diagonal length of an effective image pickup region of an image pickup element, and e is an equivalent length in air to a length measured along an optical axis from a ray-entering surface to a ray-exiting surface of the optical element.

10. A zoom lens according to claim 1, wherein the optical element is a prism and satisfies the following condition:

$$1.45 < n_{pri}$$

where $n_{pri}$ is a refractive index for d-line rays of a medium of the prism.

11. A zoom lens according to claim 1, further comprising a second lens unit and satisfying the following condition:

$$0.85 < -\beta_{Rt} < 2.0$$

where $\beta_{Rt}$ is a compound magnification of an optical system formed of the second lens unit and components arranged thereafter under a condition where an object at an infinite distance is in focus at a telephoto end.

12. A zoom lens according to claim 1, further comprising a second lens unit and a third lens unit and satisfying the following conditions:

$$0.2 < -M_3/M_2 < 0.75$$

where $M_2$ is an amount of shift of the second lens unit in a magnification change from a wide-angle end to a telephoto end under a condition where an object point at an infinite distance is in focus, and $M_3$ is an amount of shift of the third lens unit in a magnification change from the wide-angle end to the telephoto end under the condition where an object point at an infinite distance is in focus.

13. A zoom lens according to claim 1, further comprising a lens subunit and satisfying the following condition:

$$0 < f_{11}/f_{12} < 1.6$$

where $f_{11}$ is a focal length of the prism in the first lens unit, and $f_{12}$ is a focal length of the lens subunit.

14. A zoom lens according to claim 1, having an optical member or an optical thin film that satisfies the following conditions:

$$\tau_{600}/\tau_{550} \leq 0.8$$

$$\tau_{700}/\tau_{550} \geq 0.08$$

where $\tau_{550}$ is a transmittance of the optical member or optical thin film at the wavelength 550 nm, $\tau_{600}$ is a transmittance of the optical member or optical thin film at the wavelength 600 nm, and $r_{700}$ is a transmittance of the optical member or optical thin film at the wavelength 700 nm.

15. A zoom lens according to claim 1, having an optical member or an optical thin film that satisfies the following conditions:

$$\tau_{400}/\tau_{550} \leq 0.08$$

$$\tau_{440}/\tau_{550} \geq 0.4$$

where $\tau_{400}$ is a transmittance of the optical member or optical thin film at the wavelength 400 nm, $\tau_{440}$ is a transmittance of the optical member or optical thin film at the wavelength 440 nm, and $\tau_{550}$ is a transmittance of the optical member or optical thin film at the wavelength 550 nm.

16. A zoom lens according to claim 1, wherein the zoom lens forms an object image on an electronic image pickup element arranged on the image surface, has at least one optical lowpass filter, and satisfies the following conditions:

when a<4 μm, $0.08a < t_{LPF} < 0.16a$ when a<3 μm, $0.075a < t_{LPF} < 0.15a$ where a, in micrometers, is a horizontal pixel pitch of the electronic image pickup element, and $t_{LPF}$, in millimeters, is a thickness of a thickest optical lowpass filter having one crystal axis that forms an angle with the optical axis of the zoom lens in a range from 35 deg. to 55 deg., as measured along the optical axis.

17. A zoom lens according to claim 3, wherein the third lens unit has a fixedly positioned lens component and a shifting lens component in a magnification change from a wide-angle end to a telephoto end.

18. A zoom lens according to claim 1, wherein the optical element is a prism.

* * * * *

UNITED STATES PATENT AND TRADEMARK OFFICE
CERTIFICATE OF CORRECTION

PATENT NO. : 6,985,301 B2
APPLICATION NO. : 10/692809
DATED : January 10, 2006
INVENTOR(S) : Shinichi Mihara It is certified that error appears in the above-identified patent and that said Letters Patent is hereby corrected as shown below:

| Column | Line | |
|---|---|---|
| 32 | 10 | Change "$T_{600}/T_{550} \leq 0.8$" to -- $T_{600}/T_{550} \geq 0.8$ --. |
| 32 | 12 | Change "$T_{700}/T_{550} \geq 0.08$" to -- $T_{700}/T_{550} \leq 0.08$ --. |

Signed and Sealed this

Twenty-second Day of August, 2006

JON W. DUDAS
*Director of the United States Patent and Trademark Office*